(12) United States Patent
Kobayashi et al.

(10) Patent No.: US 10,179,445 B2
(45) Date of Patent: Jan. 15, 2019

(54) METHOD FOR PRODUCING OPTICAL MEMBER AND USE OF ULTRAVIOLET RAY CURED RESIN COMPOSITION FOR SAME

(71) Applicant: Nippon Kayaku Kabushiki Kaisha, Chiyoda-ku, Tokyo (JP)

(72) Inventors: Daisuke Kobayashi, Tokyo (JP); Hayato Motohashi, Tokyo (JP); Yuichiro Matsuo, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 32 days.

(21) Appl. No.: 14/674,278

(22) Filed: Mar. 31, 2015

(65) Prior Publication Data

US 2015/0224756 A1    Aug. 13, 2015

Related U.S. Application Data

(63) Continuation of application No. 14/353,115, filed as application No. PCT/JP2012/006711 on Oct. 19, 2012.

(30) Foreign Application Priority Data

Oct. 21, 2011    (JP) ................................. 2011-231465

(51) Int. Cl.
*B32B 37/14*    (2006.01)
*B32B 38/00*    (2006.01)
(Continued)

(52) U.S. Cl.
CPC ............ *B32B 38/0008* (2013.01); *B32B 7/12* (2013.01); *B32B 17/10018* (2013.01);
(Continued)

(58) Field of Classification Search
CPC . B32B 38/0008; B32B 7/12; B32B 17/10018; B32B 17/10036;
(Continued)

(56) References Cited

U.S. PATENT DOCUMENTS 3,981,762 A * 9/1976 Davis ...................... B29C 63/00
156/307.3
6,004,413 A * 12/1999 Couttenier .............. B29C 35/10
156/273.5
(Continued)

FOREIGN PATENT DOCUMENTS

CA            1337223 C      10/1995
CN         101331529 A      12/2008
(Continued)

OTHER PUBLICATIONS

TW 201026801 English translation. Jul. 2010.*
(Continued)

*Primary Examiner* — Michael N Orlando
*Assistant Examiner* — Elizabeth Bradford
(74) *Attorney, Agent, or Firm* — Nields, Lemack & Frame, LLC

(57) ABSTRACT

Method for producing an optical member, in which at least two optical substrates, of which at least either has a light shielding portion, are bonded to each other using an ultraviolet ray cured resin composition containing (A) a (meth) acrylate and (B) a photopolymerization initiator, an optical member obtained by the producing method, the use of an ultraviolet ray cured resin composition containing (A) a (meth)acrylate and (B) a photopolymerization initiator, and the ultraviolet ray cured resin composition. A bonded optical member causing little damage to an optical substrate, and exhibiting favorable productivity and excellent cure extent and adherence, for example, a touch panel or a display body (Continued)

unit having an optical substrate having a light shielding portion can be produced by the producing method of the present invention, and an optical member exhibiting high cure extent of resin at a light shielding portion and high reliability can be obtained.

12 Claims, 5 Drawing Sheets

(51) Int. Cl.
| | |
|---|---|
| C08F 2/48 | (2006.01) |
| C09J 5/00 | (2006.01) |
| B32B 37/12 | (2006.01) |
| G02B 1/04 | (2006.01) |
| G02B 1/12 | (2006.01) |
| B32B 17/10 | (2006.01) |
| C08F 290/06 | (2006.01) |
| B32B 7/12 | (2006.01) |
| G02F 1/1333 | (2006.01) |

(52) U.S. Cl.
CPC .. *B32B 17/10036* (2013.01); *B32B 17/10348* (2013.01); *B32B 17/10706* (2013.01); *B32B 17/10743* (2013.01); *B32B 37/1207* (2013.01); *B32B 37/14* (2013.01); *C08F 2/48* (2013.01); *C08F 290/062* (2013.01); *C08F 290/067* (2013.01); *C09J 5/00* (2013.01); *G02B 1/04* (2013.01); *G02B 1/12* (2013.01); *B32B 2037/1253* (2013.01); *B32B 2255/26* (2013.01); *B32B 2309/02* (2013.01); *B32B 2309/105* (2013.01); *B32B 2309/68* (2013.01); *B32B 2310/0831* (2013.01); *B32B 2333/12* (2013.01); *B32B 2457/20* (2013.01); *B32B 2457/208* (2013.01); *C09J 2203/318* (2013.01); *C09J 2205/31* (2013.01); *C09J 2433/00* (2013.01); *G02F 1/13338* (2013.01); *Y10T 428/31551* (2015.04); *Y10T 428/31938* (2015.04)

(58) Field of Classification Search
CPC ........ B32B 17/10348; B32B 17/10706; B32B 17/10743; B32B 37/1207; B32B 37/14; C08F 2/48; C08F 290/062; C08F 290/067; C09J 5/00; G02B 1/04; G02B 1/12
USPC ..................................... 156/272.2
See application file for complete search history.

(56) References Cited

U.S. PATENT DOCUMENTS

| | | | |
|---|---|---|---|
| 8,087,967 B2 | 1/2012 | Shinya et al. | |
| 9,309,374 B2* | 4/2016 | Hayashi | G02F 1/1335 |
| 2002/0196393 A1* | 12/2002 | Tashiro | G02F 1/1303 |
| | | | 349/106 |
| 2009/0162645 A1 | 6/2009 | Matsuhira | |
| 2009/0186552 A1 | 7/2009 | Shinya et al. | |
| 2009/0296033 A1 | 12/2009 | Shinya et al. | |
| 2010/0003425 A1 | 1/2010 | Kamata et al. | |
| 2010/0033661 A1 | 2/2010 | Shinya et al. | |
| 2010/0043965 A1 | 2/2010 | Kamiya et al. | |
| 2010/0097552 A1 | 4/2010 | Shinya et al. | |
| 2010/0097746 A1 | 4/2010 | Toyoda et al. | |
| 2010/0098839 A1 | 4/2010 | Toyoda et al. | |
| 2010/0118245 A1 | 5/2010 | Toyoda et al. | |
| 2010/0134713 A1 | 6/2010 | Toyoda et al. | |
| 2010/0178834 A1 | 7/2010 | Toyoda et al. | |
| 2010/0210166 A1 | 8/2010 | Toyoda et al. | |
| 2010/0247940 A1 | 9/2010 | Takahashi et al. | |
| 2010/0277684 A1* | 11/2010 | Fukushima | H01L 51/5246 |
| | | | 349/158 |
| 2011/0177261 A1 | 7/2011 | Ishii et al. | |
| 2011/0201717 A1 | 8/2011 | Held et al. | |
| 2011/0201718 A1 | 8/2011 | Naitou et al. | |
| 2012/0118483 A1 | 5/2012 | Toyoda et al. | |
| 2012/0120347 A1 | 5/2012 | Takahashi et al. | |
| 2012/0172477 A1 | 7/2012 | Huang et al. | |
| 2012/0263956 A1 | 10/2012 | Watanabe et al. | |
| 2013/0040123 A1* | 2/2013 | Cho | C09J 133/08 |
| | | | 428/220 |
| 2013/0284360 A1 | 10/2013 | Held et al. | |
| 2014/0023799 A1 | 1/2014 | Takahashi et al. | |
| 2014/0043569 A1 | 2/2014 | Yabuta et al. | |
| 2014/0248498 A1 | 9/2014 | Kobayashi et al. | |
| 2014/0256207 A1 | 9/2014 | Toyoda et al. | |
| 2014/0287153 A1 | 9/2014 | Toyoda et al. | |
| 2014/0329431 A1 | 11/2014 | Shinya et al. | |
| 2015/0253598 A1 | 9/2015 | Shinya et al. | |
| 2016/0011454 A1 | 1/2016 | Toyoda et al. | |

FOREIGN PATENT DOCUMENTS

| | | |
|---|---|---|
| CN | 101652803 A | 2/2010 |
| CN | 101816026 A | 8/2010 |
| CN | 102144009 A | 8/2011 |
| CN | 102153953 A | 8/2011 |
| CN | 102203862 A | 9/2011 |
| CN | 103635493 B | 1/2015 |
| CN | 104629573 A | 5/2015 |
| EP | 1048707 A1 | 11/2000 |
| EP | 2133856 A1 | 12/2009 |
| EP | 2169455 A1 | 3/2010 |
| EP | 2330151 A1 | 6/2011 |
| JP | 63-284213 A | 11/1988 |
| JP | 4-107523 A | 4/1992 |
| JP | 4-368913 A | 12/1992 |
| JP | 6-337411 A | 12/1994 |
| JP | 11-152451 A | 6/1999 |
| JP | 11-254608 A | 9/1999 |
| JP | 2000-249836 A | 9/2000 |
| JP | 2001-174639 A | 6/2001 |
| JP | 2003-207790 A | 7/2003 |
| JP | 2004-77887 A | 3/2004 |
| JP | 2004-230776 A | 8/2004 |
| JP | 2005-274915 A | 10/2005 |
| JP | 2007-056162 A | 3/2007 |
| JP | 2008-129159 A | 6/2008 |
| JP | 2008-241728 A | 10/2008 |
| JP | 2008-248221 A | 10/2008 |
| JP | 2008-281997 A | 11/2008 |
| JP | 2009-1654 A | 1/2009 |
| JP | 2009-127023 A | 6/2009 |
| JP | 2009-186954 A | 8/2009 |
| JP | 2009-294360 A | 12/2009 |
| JP | 2010-79098 A | 4/2010 |
| JP | 2010-224094 A | 10/2010 |
| JP | 2010-248387 A | 11/2010 |
| JP | 2011-511851 A | 4/2011 |
| JP | 4711354 B2 | 6/2011 |
| JP | 2011-190421 A | 9/2011 |
| JP | 2012-046658 A | 3/2012 |
| JP | 2012-73533 A | 4/2012 |
| JP | 5411394 B2 | 2/2014 |
| JP | 5745708 B1 | 7/2015 |
| JP | 2015-199962 A | 11/2015 |
| JP | 2015-206044 A | 11/2015 |
| JP | 2015-206045 A | 11/2015 |
| JP | 2015-206046 A | 11/2015 |
| JP | 2015-221894 A | 12/2015 |
| TW | 200914924 A | 4/2009 |
| TW | 201026801 A | 7/2010 |
| TW | 201026801 A1 * | 7/2010 |
| TW | I486363 B | 6/2015 |
| TW | 201527332 A | 7/2015 |
| TW | 201531492 A | 8/2015 |
| WO | 2008/111580 A1 | 9/2008 |
| WO | 2009/054168 A1 | 4/2009 |

(56) References Cited

FOREIGN PATENT DOCUMENTS

| WO | 2010/027041 A1 | 3/2010 |
|---|---|---|
| WO | 2011/045862 A1 | 4/2011 |
| WO | 2012/144434 A1 | 10/2012 |

OTHER PUBLICATIONS

Chinese communication, with English translation, dated Dec. 28, 2015 in corresponding Chinese patent application No. 201410822793.5.
Japanese communication, with English translation, dated Apr. 12, 2016 in corresponding Japanese patent application No. 2013-230123.
Japanese communication, with English translation, dated Apr. 19, 2016 in corresponding Japanese patent application No. 2015-094117.
Japanese communication, with English translation, dated May 24, 2016 in corresponding Japanese patent application No. 2015-094112.
Japanese communication, with English translation, dated May 24, 2016 in corresponding Japanese patent application No. 2015-094113.
Japanese communication, with English translation, dated May 24, 2016 in corresponding Japanese patent application No. 2015-094115.
Japanese communication, with English translation, dated May 31, 2016 in corresponding Japanese patent application No. 2015-094114.
Japanese communication, with English translation, dated May 31, 2016 in corresponding Japanese patent application No. 2015-094116.
European Communication dated Jun. 12, 2015 in corresponding European patent application No. 12841961.1.
International Search Report and Written Opinion dated Dec. 11, 2012 in corresponding PCT application No. PCT/JP2012/006711.
International Preliminary Report on Patentability dated May 1, 2014 in corresponding PCT application No. PCT/JP2012/006711.
Chinese communication, with English translation, dated Jul. 3, 2014 in corresponding Chinese patent application No. 201280031719.0.
Japanese communication, with English translation, dated Jul. 9, 2013 in corresponding Japanese patent application No. 2013-521329.
Japanese communication, with English translation, dated Oct. 8, 2013 in corresponding Japanese patent application No. 2013-521329.
Korean communication, with English translation, dated May 27, 2014 in corresponding Korean patent application No. 10-2013-7034550.
Korean communication, with English translation, dated Aug. 7, 2014 in corresponding Korean patent application No. 10-2013-7034550.
Korean communication, with English translation, dated Jan. 26, 2015 in corresponding Korean patent application No. 10-2014-7018055.
Taiwanese communication, with English translation, dated Mar. 10, 2014 in corresponding Taiwanese patent application No. 101138878.
Taiwanese communication, with English translation, dated Aug. 18, 2014 in corresponding Taiwanese patent application No. 101138878.
Taiwanese communication, with English translation, dated May 12, 2016 in corresponding Taiwanese patent application No. 101138878.
Taiwanese communication, with English translation, dated May 12, 2016 in corresponding Taiwanese patent application No. 104112364.
Taiwanese communication, with English translation, dated May 12, 2016 in corresponding Taiwanese patent application No. 104112371.
Chinese communication, with English translation, dated Jan. 26, 2016 in corresponding Chinese patent application No. 201410822791.6.
Chinese communication, with English translation, dated Feb. 3, 2016 in corresponding Chinese patent application No. 201410822034.9.
Taiwanese communication, with English translation, dated Mar. 18, 2015 in corresponding Taiwanese patent application No. 101138878.
Chinese communication, with English translation, dated Apr. 18, 2016 in corresponding Chinese patent application No. 201410822529.1.
European communication dated May 2, 2016 in corresponding European patent application No. 12841961.1.
"Acrylate Adhesive" Edition 1, Apr. 30, 2006, Zhang, Junying et al., Chemical Industry Press.
Chinese communication, with English translation, dated Mar. 28, 2016 in corresponding Chinese patent application No. 201410822095.5.
Chinese communication, with English translation, dated Apr. 1, 2016 in corresponding Chinese patent application No. 201410822988.X.
Taiwanese communication, with English translation, dated Oct. 26, 2015 in corresponding Taiwanese patent application No. 104112360.
Taiwanese communication, with English translation, dated Oct. 27, 2015 in corresponding Taiwanese patent application No. 104112362.
Taiwanese communication, with English translation, dated Oct. 26, 2015 in corresponding Taiwanese patent application No. 104112364.
Taiwanese communication, with English translation, dated Oct. 26, 2015 in corresponding Taiwanese patent application No. 104112365.
Taiwanese communication, with English translation, dated Oct. 26, 2015 in corresponding Taiwanese patent application No. 104112368.
Taiwanese communication, with English translation, dated Oct. 26, 2015 in corresponding Taiwanese patent application No. 104112371.
Taiwanese communication, with English translation, dated Oct. 27, 2015 in corresponding Taiwanese patent application No. 104112372.
Chinese communication, with English translation, dated Oct. 24, 2017 in corresponding Chinese patent application No. 201410822529.1.
Office Action dated Sep. 7, 2016 in co-pending U.S. Appl. No. 14/353,115.
Chinese communication, with English translation, dated Dec. 18, 2017 in corresponding Chinese patent application No. 201410826430.9.
Chinese communication, with English translation, dated Dec. 21, 2017 in corresponding Chinese patent application No. 201410822034.9.
European communication dated Feb. 7, 2018 in corresponding European patent application No. 12841961.1.
Junxian Li, "Plastic Industry Handbook: Polyurethanes", Chemical Industry Press, Beijing, 1999.
Zhai et al., "Radiation Processing Technology and Progress of Polymer Materials", Chemical Industry Press, Materials Science and Engineering Publishing Center, Beijing, 2004.
Taiwanese communication, with English translation, dated Jul. 6, 2016 in corresponding Taiwanese patent application No. 104112368.
Taiwanese communication, with English translation, dated Jul. 11, 2016 in corresponding Taiwanese patent application No. 104112360.
Taiwanese communication, with English translation, dated Jul. 11, 2016 in corresponding Taiwanese patent application No. 104112372.

* cited by examiner

METHOD FOR PRODUCING OPTICAL MEMBER AND USE OF ULTRAVIOLET RAY CURED RESIN COMPOSITION FOR SAME

This application is a Continuation of U.S. patent application Ser. No. 14/353,115 filed Apr. 21, 2014, the disclosure of which is incorporated herein by reference, and is a 371 of International Application No. PCT/JP2012/006711 filed Oct. 19, 2012.

TECHNICAL FIELD

The present invention relates to a method for producing an optical member, in which an optical substrate having a light shielding portion and another optical substrate are bonded to each other, and the use of an ultraviolet ray cured resin composition for the method.

BACKGROUND ART

In recent years, a display device capable of screen input by bonding a touch panel to a display screen of the display device such as a liquid crystal display, a plasma display, or an organic EL display is widely used. This touch panel has a structure, in which glass plates or resin films having a transparent electrode formed thereon are bonded to one another with a slight gap, and if necessary, a transparent protective plate of glass or resin is bonded onto the touch surface.

There is a technique in which a pressure sensitive adhesive double coated sheet is used to bond a glass plate or film having a transparent electrode formed thereon to a transparent protective plate of glass or resin in a touch panel, or to bond a touch panel to a display body unit. However, there is a problem that air bubbles are easily generated when a pressure sensitive adhesive double coated sheet is used. A technique in which these are bonded with an ultraviolet ray cured resin composition having flexibility has been suggested as an alternative technique to the adhesive double coated sheet.

Meanwhile, a light shielding portion of belt shape is formed at the outermost edge of a transparent protective plate in order to improve the contrast of a display image. In a case in which the transparent protective plate having a light shielding portion formed thereon is bonded with an ultraviolet ray cured resin composition, insufficient ultraviolet rays reach the ultraviolet ray cured resin in the light shielded region, which corresponds to the shade of the light shielding portion, because of the light shielding portion, and thus the curing of the resin in the light shielded region is not sufficient. If the curing of resin is not sufficient, problems such as display unevenness in the display image near the light shielding portion occurs.

As a technique to improve the curing of resin in a light shielded region, Patent Literature 1 discloses a technique, in which an organic peroxide is contained in an ultraviolet ray cured resin, and the resin thus obtained is irradiated with ultraviolet rays and then heated, whereby the resin in a light shielded region is cured. However, it is concerned that a heating process causes damage to a liquid crystal display device and the like. Moreover, there is a problem of poor productivity since the heating process requires generally 60 minutes or longer time to secure sufficient curing of resin. In addition, Patent Literature 2 discloses a technique, in which the resin in a light shielded region is cured by irradiating with ultraviolet rays from the outer side surface of the light shielding portion forming surface. However, there is limitation in this technique since it is sometimes difficult to irradiate the resin with ultraviolet rays from the side surface depending on the shape of a liquid crystal display device. In addition, Patent Literature 3 discloses a technique, in which slow acting property of a cationically polymerizable ultraviolet ray cured resin is used, but the resin after curing is poor in flexibility.

CITATION LIST

Patent Literatures

Patent Literature 1: JP 4711354 B1
Patent Literature 2: JP 2009-186954 A
Patent Literature 3: JP 2010-248387 A

SUMMARY OF INVENTION

Technical Problem

An object of the present invention is to provide a method for producing an optical member using an ultraviolet ray cured resin composition capable of providing an optical member such as a touch panel or a display body unit causing little damage to an optical substrate, favorable in productivity, and excellent in curability and adherence, and an optical member exhibiting high cure extent of resin in a light shielding portion and high reliability.

Solution of Problem

The inventors have conducted intensive investigations in order to solve the problems described above, and as a result, have found out the following fact, thereby completing the present invention. The problems described above is solved by producing an optical substrate having a light shielding portion and another optical substrate by a method having a specific process using an ultraviolet ray cured resin composition. In other words, the present invention relates to the following items (1) to (19).

(1)
A method for producing an optical member including at least an optical substrate to be bonded having a light shielding portion and at least two optical substrates bonded to each other, the method including the following Processes 1 to 3:

Process 1: a process of obtaining an optical substrate having a cured product layer having a cured part present on an optical substrate side in a coating layer and an uncured part present on the opposite side to the optical substrate side by coating an ultraviolet ray cured resin composition containing (A) a (meth)acrylate and (B) a photopolymerization initiator with respect to at least an optical substrate to form the coating layer, and irradiating the coating layer with ultraviolet rays;

Process 2: a process of bonding another optical substrate or an uncured part of a cured product layer of another optical substrate obtained by Process 1 with respect to the uncured part of the cured product layer of the optical substrate obtained in Process 1; and Process 3: a process of curing the cured product layer by irradiating a cured product layer having an uncured part in a bonded optical substrate with ultraviolet rays through an optical substrate having a light shielding portion.

(2)

The method for producing an optical member according to the item (1) described above, in which an irradiation dose of ultraviolet rays in Process 1 is from 5 to 200 mJ/cm$^2$.

(3)

The method for producing an optical member according to the item (1) or (2) described above, in which oxygen or ozone is blown upon a surface of the opposite side to the optical substrate side of the coating layer at the time of irradiating ultraviolet rays in Process 1.

(4)

The method for producing an optical member according to any one of the items (1) to (3) described above, in which the optical substrate is at least a display body unit selected from the group consisting of a transparent glass substrate having a light shielding portion, a transparent resin substrate having a light shielding portion, a glass substrate having a light shielding portion and a transparent electrode formed thereon, a liquid crystal display unit, a plasma display unit, and an organic EL display unit (5)

The method for producing an optical member according to any one of the items (1) to (4) described above, in which one optical substrate is a protective substrate having a light shielding portion and the other optical substrate to be bonded to the one substrate is a touch panel or a display body unit having a touch panel, and an optical member including at least two optical substrates bonded to each other is a touch panel having a protective substrate having a light shielding portion or a display body unit having the touch panel, and either one or both of a surface provided with a light shielding portion of a protective substrate having the light shielding portion and a touch surface of a touch panel are coated with the ultraviolet ray cured resin composition in Process 1.

(6)

The method for producing an optical member according to any one of the items (1) to (4) described above, in which one optical substrate is an optical substrate having a light shielding portion and the other optical substrate to be bonded to the one substrate is a display body unit, and an optical member including at least two optical substrates bonded to each other is a display body unit having an optical substrate having a light shielding portion, and either one or both of a surface provided with a light shielding portion of an optical substrate having a light shielding portion and a display surface of a display body unit are coated with the ultraviolet ray cured resin composition in Process 1.

(7)

The method for producing an optical member according to the item (6) described above, in which an optical substrate having a light shielding portion is a protective substrate to protect a display screen in a display body unit or a touch panel, and either one or both of a surface of a side having a light shielding portion of a protective substrate and a substrate surface opposite to a touch surface of a touch panel or a display surface of a display body unit are coated with the ultraviolet ray cured resin composition in Process 1.

(8)

The method for producing an optical member according to any one of the items (1) to (7) described above, in which (A) the (meth)acrylate is at least a (meth)acrylate selected from the group consisting of an urethane(meth)acrylate, a (meth)acrylate having a polyisoprene backbone, and a (meth)acrylate monomer.

(9)

The method for producing an optical member according to any one of the items (1) to (7) described above, in which the ultraviolet ray cured resin composition includes both of:
(i) at least either an urethane(meth)acrylate or a (meth)acrylate having a polyisoprene backbone, and
(ii) a (meth)acrylate monomer,
as (A) the (meth)acrylate.

(10)

The method for producing an optical member according to any one of the items (1) to (7) described above, in which the ultraviolet ray cured resin composition includes both of:
(i) an urethane(meth)acrylate obtained by a reaction of poly C2-C4 alkylene glycol, diisocyanate, and hydroxy C2-C4 alkyl(meth)acrylate, and
(ii) a (meth)acrylate monomer,
as (A) the (meth)acrylate.

(11)

The method for producing an optical member according to the item (9) or (10) described above, in which a weight average molecular weight of the urethane(meth)acrylate is from 7,000 to 25,000.

(12)

The method for producing an optical member according to any one of the items (1) to (11) described above, in which an acylphosphine oxide compound is included as (B) the photopolymerization initiator.

(13)

The method for producing an optical member according to the item (12) described above, in which the acylphosphine oxide compound is at least a compound selected from the group consisting of 2,4,6-trimethylbenzoyldiphenylphosphine oxide, 2,4,6-trimethylbenzoylphenylethoxyphosphine oxide, bis(2,4,6-trimethyl benzoyl)-phenylphosphine oxide, and bis(2,6-dimethoxybenzoyl)-2,4,4-trimethyl-pentylphosphine oxide.

(14)

An optical member obtained by the method for producing an optical member according to any one of the items (1) to (13) described above.

(15)

A touch panel obtained by the method for producing an optical member according to the item (5) described above.

(16)

A display body unit obtained by the method for producing an optical member according to the item (6) described above.

(17)

Use of an ultraviolet ray cured resin composition containing (A) a (meth)acrylate and (B) a photopolymerization initiator for producing an optical member by the method for producing an optical member according to any one of the items (1) to (12) described above.

(18)

The use of an ultraviolet ray cured resin composition according to the item (17) described above, in which (B) the photopolymerization initiator is an acylphosphine oxide compound.

(19)

An ultraviolet ray cured resin composition to be used in the method for producing an optical member according to any one of the items (1) to (7) described above, the composition including (A) a (meth)acrylate and (B) a photopolymerization initiator.

(20)

The ultraviolet ray cured resin composition according to the item (19) described above, in which (B) the photopolymerization initiator is an acylphosphine oxide compound.

Advantageous Effects of Invention

According to the present invention, a bonded optical member causing little damage to an optical substrate and exhibiting favorable productivity and excellent cure extent and adherence, for example, a touch panel or a display body unit having an optical substrate having a light shielding portion can be obtained. Moreover, an optical member exhibiting high cure extent of resin at a light shielding portion and high reliability, and not causing a problem such as display unevenness of the display image near a light shielding portion can be provided.

DESCRIPTION OF EMBODIMENTS

Figure 1:
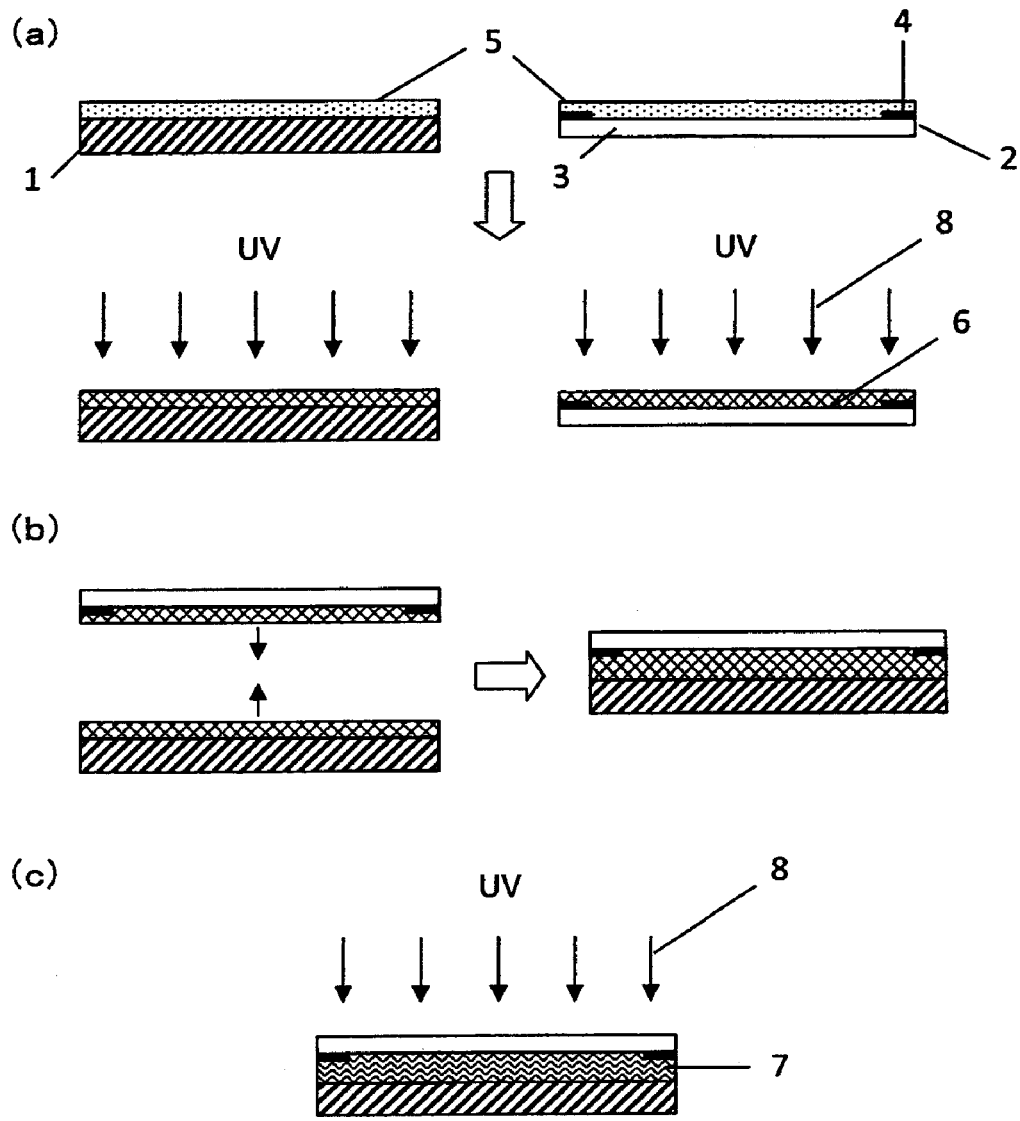
FIGS. 1(a), 1(b) and 1(c) are process diagrams illustrating an embodiment (first embodiment) of the producing method according to the present invention.

First, the method for producing an optical member using an ultraviolet ray cured resin composition of the present invention will be described.

In the method for producing an optical member of the present invention, at least one optical substrate among the optical substrates to be bonded has a light shielding portion and at least two optical substrates are bonded to each other by the following (Process 1) to (Process 3).

(Process 1) A process of obtaining an optical substrate having a cured product layer having a cured part (hereinafter, it is referred to as the "cured part of the cured product layer" or simply the "cured part") present on an optical substrate side (the lower side of the coating layer) in the coating layer and an uncured part (hereinafter, it is referred to as the "uncured part of the cured product layer" or simply the "uncured part") present on the opposite side (the upper side of the coating layer, and generally the atmosphere side) to the optical substrate side by coating an ultraviolet ray cured resin composition containing (A) a (meth)acrylate and (B) a photopolymerization initiator with respect to at least one optical substrate to form the coating layer, and irradiating the coating layer with ultraviolet rays.

(Process 2) A process of bonding another optical substrate or an uncured part of a cured product layer of another optical substrate obtained by Process 1 with respect to the uncured part of the cured product layer of the optical substrate obtained in Process 1.

(Process 3) A process of curing the cured product layer by irradiating a cured product layer having an uncured part in a bonded optical substrate with ultraviolet rays through an optical substrate having a light shielding portion.

Hereinafter, specific embodiments of the method for producing an optical member through Process 1 to Process 3 of the present invention will be described by exemplifying a case, in which a liquid crystal display unit and a transparent substrate having a light shielding portion are bonded to each other, with reference to drawings.

(First Embodiment)

FIGS. 1(a) to (c) are process diagrams illustrating the first embodiment of the method for producing an optical member using an ultraviolet ray cured resin composition according to the present invention.

This first embodiment is a method for obtaining an optical member (a liquid crystal display unit having a light shielding portion) by bonding a liquid crystal display unit 1 to a transparent substrate 2 having a light shielding portion.

The liquid crystal display unit 1 is a liquid crystal display unit prepared by enclosing a liquid crystal material between a pair of substrates having an electrode formed thereon and then equipping the pair of substrates with a polarizing plate, a driving circuit, a signal input cable, and a backlight unit.

The transparent substrate 2 having a light shielding portion is a transparent substrate prepared by forming a light shielding portion 4 of black frame shape on the surface of the bonding surface of a transparent substrate 3 such as a glass plate, a polymethyl methacrylate (PMMA) plate, a polycarbonate (PC) plate, or an alicyclic polyolefin polymer (COP) plate.

Here, the light shielding portion 4 is formed by gluing tape, coating a coating, printing, or the like.

(Process 1)

First, as illustrated in FIG. 1(a), an ultraviolet ray cured resin composition containing (A) a (meth)acrylate and (B) a photopolymerization initiator is coated on the display surface of the liquid crystal display unit 1 and the surface having a light shielding portion formed thereon of the transparent substrate 2, respectively. As the coating method, a method using a slit coater, a roll coater, or a spin coater, or a screen printing method is exemplified. Here, the ultraviolet ray cured resin compositions coated on the surface of the liquid crystal display unit 1 and the surface of the transparent substrate 2 having a light shielding portion may be the same as each other, or different ultraviolet ray cured resin compositions may be used. It is generally preferable that the ultraviolet ray cured resin compositions used for both surfaces are the same as each other.

The film thickness of the cured product of each of the ultraviolet ray cured resins is adjusted such that the cured product layer of resin 7 after bonding is from 50 to 500 μm, preferably from 50 to 350 μm, and further preferably from 100 to 350 μm. Here, the film thickness of the cured product layer of the ultraviolet ray cured resin present on the surface of the transparent substrate 2 having a light shielding portion is, although it depends on the film thickness, generally preferably the same as or thicker than the film thickness of the cured product layer of the ultraviolet ray cured resin present on the surface of the liquid crystal display unit 1. The reason for this is to eliminate the risk of poor curing by minimizing the uncured part even after the irradiation of ultraviolet rays in Process 3 to be described below.

A cured product layer 6 having a cured part (not illustrated in the drawing) present on the lower side (the liquid crystal display unit side or the transparent substrate side when seen from the ultraviolet ray cured resin composition) of the coating layer and an uncured part (not illustrated in the drawing) present on the upper side (the opposite side to the liquid crystal display unit side or the opposite side to the transparent substrate side) (the atmosphere side when performed in the air) of the coating layer is obtained by irradiating an ultraviolet ray cured resin composition layer 5 after coating with ultraviolet rays 8. The irradiation dose of ultraviolet rays at this time is preferably from 5 to 200 mJ/cm$^2$, and particularly preferably from 10 to 100 mJ/cm$^2$. If the irradiation dose is too little, insufficient cure extent of the resin in the light shielded region of the optical member bonded in the end is concerned, and if the irradiation dose is too much, the uncured part becomes small and thus bonding failure between the liquid crystal display unit 1 and the transparent substrate 2 having a light shielding portion is concerned. With regard to the light source used in the irradiation of ultraviolet rays from ultraviolet to near ultraviolet, any kind of light source may be used if a light source is a lamp emitting a light beam of from ultraviolet to near-ultraviolet. Examples thereof include a low pressure mercury lamp, a high pressure mercury lamp, or an extra-high pressure mercury lamp, a metal halide lamp, a (pulse) xenon lamp, and an electrodeless lamp.

In the present specification, the term "uncured" denotes a state that the curing is not advanced at all or is advanced little, and thus the resin composition has fluidity of the same extent as that at the time of coating and can be washed away with a solvent.

In Process 1, the irradiation of ultraviolet rays is preferably performed from the upper side surface (the opposite side to the liquid crystal display unit side or the opposite side to the transparent substrate side when seen from the ultraviolet ray cured resin composition) (generally the atmosphere side surface) of a coating layer generally in the air. In addition, the irradiation of ultraviolet rays may be performed while spraying a curing inhibitory gas on the upper surface of the coating layer after evacuating. The opposite side to the liquid crystal display unit side or the opposite side to the transparent substrate side becomes the atmosphere side in a case in which a resin composition is cured in the air.

At the time of the irradiation of ultraviolet rays, the state and film thickness of the uncured part can be adjusted by blowing oxygen or ozone upon the surface of the ultraviolet ray cured resin layer (coating layer).

In other words, the uncured state of the surface of the coating layer can be secured or the film thickness of the uncured part can be thickened since oxygen inhibition on curing of the ultraviolet ray cured resin composition occurs on the surface of the coating layer by blowing oxygen or ozone thereupon.

(Process 2)

Next, the liquid crystal display unit 1 and the transparent substrate 2 having a light shielding portion are bonded to each other as illustrated in FIG. 1(*b*) in the form that the uncured parts face each other. The bonding can be performed in the air or in a vacuum.

Here, it is suitable to perform bonding in a vacuum in order to prevent bubbles form generating at the time of bonding.

As described above, the improvement in adhesive force can be expected if a cured product of an ultraviolet ray cured resin of having a cured part and an uncured part for each of the liquid crystal display unit and the transparent substrate is prepared, and then the cured products are bonded together.

(Process 3)

Next, as illustrated in FIG. 1(*c*), the ultraviolet ray cured resin composition layer (coating layer) is cured by irradiating the optical member obtained by bonding the transparent substrate 2 and the liquid crystal display unit 1 to each other with ultraviolet rays 8 from the side of the transparent substrate 2 having a light shielding portion.

The irradiation dose of ultraviolet rays is preferably from 100 to 4,000 mJ/cm$^2$, and particularly preferably from 200 to 3,000 mJ/cm$^2$. With regard to the light source used for curing by the irradiation of light beam of from ultraviolet to near ultraviolet, any kind of light source may be used if a light source is a lamp emitting a light beam of from ultraviolet to near-ultraviolet. Examples thereof include a low pressure mercury lamp, a high pressure mercury lamp, or an extra-high pressure mercury lamp, a metal halide lamp, a (pulse) xenon lamp, and an electrodeless lamp.

Figure 4:
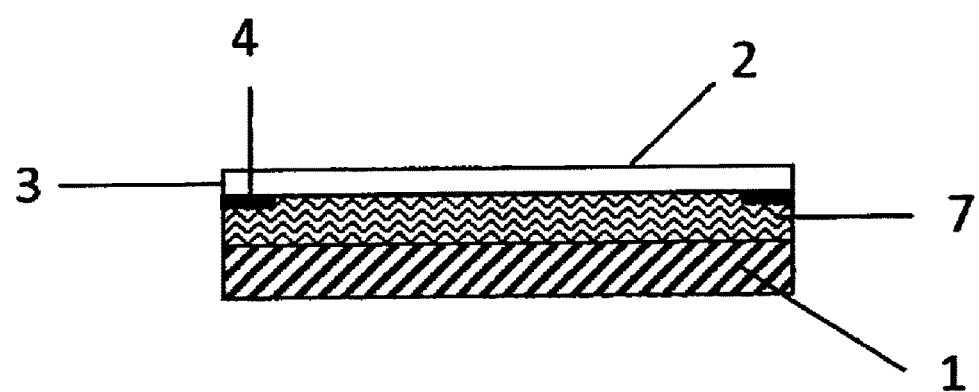
FIG. 4 is a schematic drawing of an optical member obtained by the present invention.

In this manner, an optical member illustrated in FIG. 4 can be obtained.

(Second Embodiment)

Figure 2:
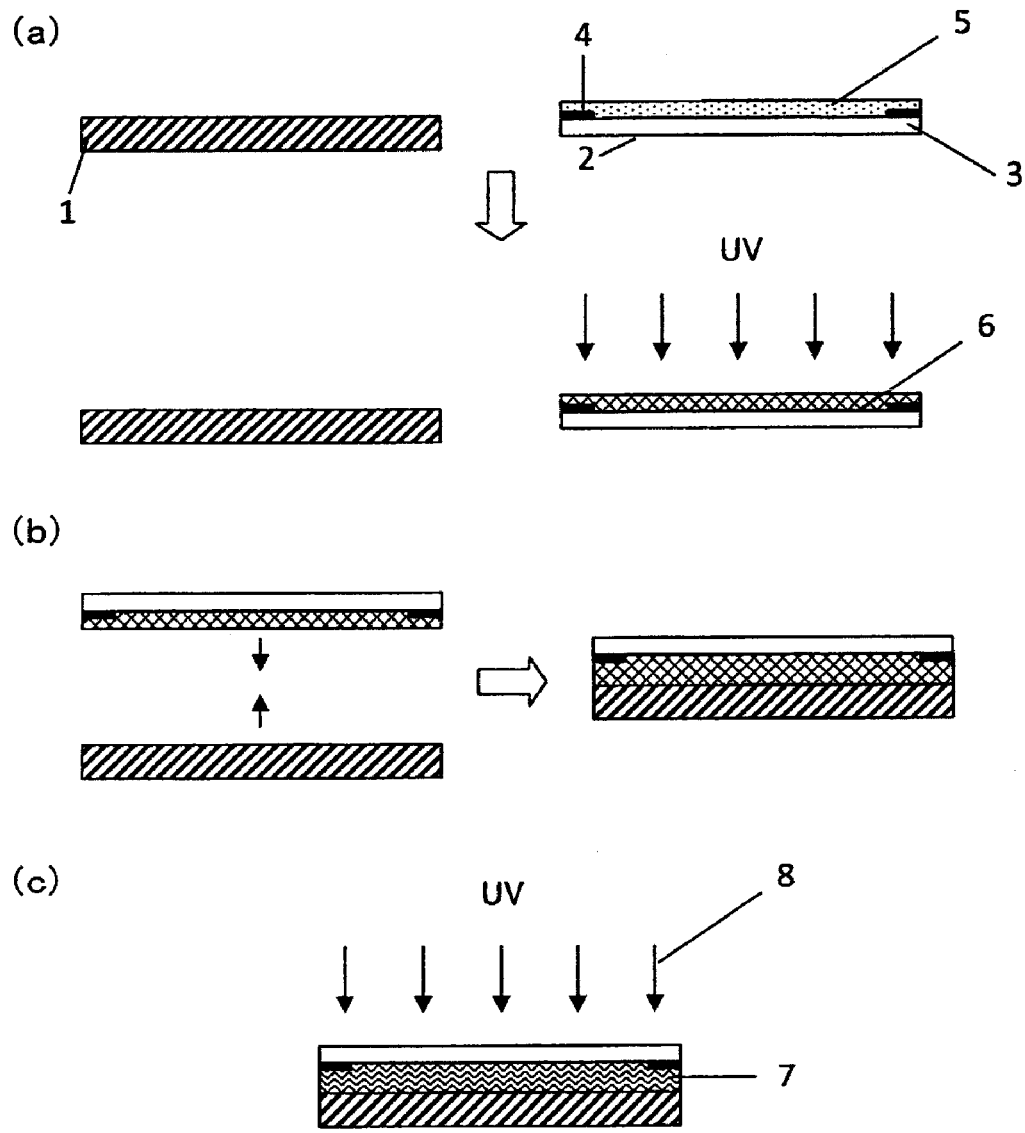
FIGS. 2(a), 2(b) and 2(c) are process diagrams illustrating another embodiment (third embodiment) of the producing method according to the present invention.

FIGS. 2(*a*) to 2(*c*) are process diagrams illustrating the second embodiment of the method for producing an optical member using an ultraviolet ray cured resin composition according to the present invention.

Meanwhile, the same reference numerals in the figures refer to the same elements as the constitutional elements in the first embodiment described above, and the explanation thereof will not be repeated here.

(Process 1)

Figure 5:
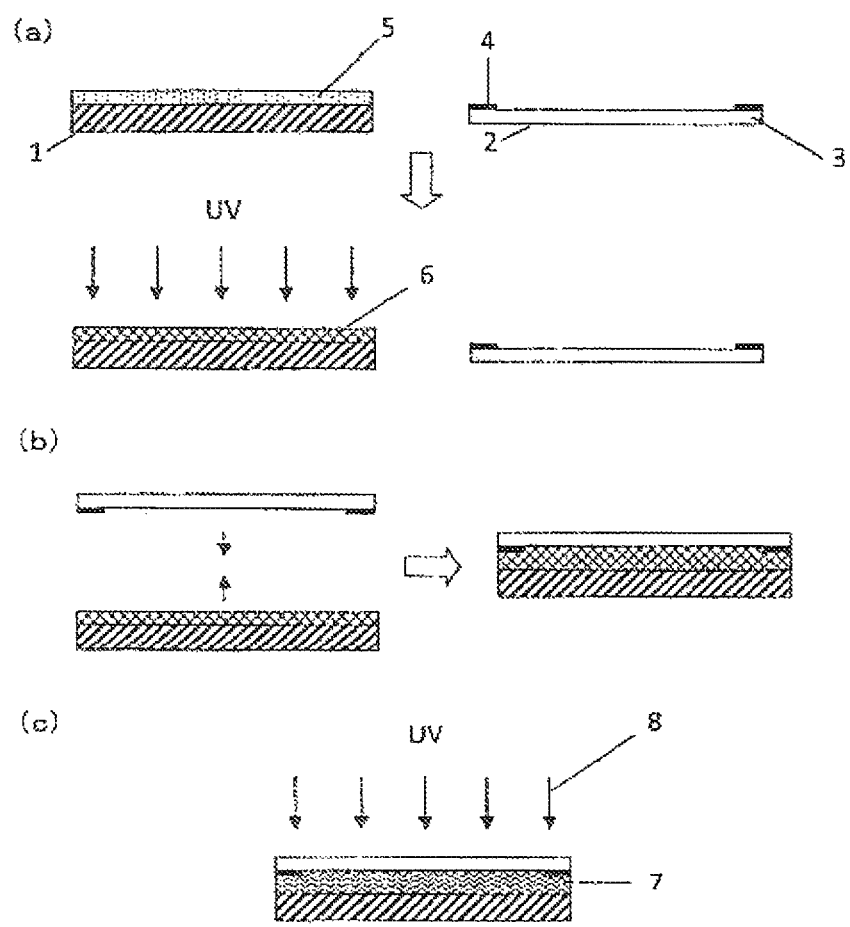
FIGS. 5(a), 5(b) and 5(c) are process diagrams illustrating another embodiment (second embodiment) of the producing method according to the present invention.

First, as illustrated in FIG. 5(*a*), an ultraviolet ray cured resin composition containing (A) a (meth)acrylate and (B) a photopolymerization initiator is coated on the surface of a liquid crystal display unit 1. Thereafter, a cured product layer 6 having a cured part present on the lower side (the liquid crystal display unit 1 side when seen from the ultraviolet ray cured resin composition) of the coating layer and an uncured part present on the upper side (the opposite side to the liquid crystal display unit 1 side) of the coating layer is obtained by irradiating an ultraviolet ray cured resin composition layer 5 with ultraviolet rays 8.

(Process 2)

Next, as illustrated in FIG. 5(*b*), the liquid crystal display unit 1 and a transparent substrate 2 is bonded to each other in the form that the uncured part of the cured product layer 6 thus obtained and the surface provided with a light shielding portion on the transparent substrate 2 having a light shielding portion face each other. The bonding can be performed in the air or in a vacuum.

(Process 3)

Next, as illustrated in FIG. 5(*c*), the cured product layer 6 having an uncured part of ultraviolet ray cured resin composition is cured by irradiating the optical member obtained by bonding the transparent substrate 2 and the liquid crystal display unit 1 to each other with ultraviolet rays 8 from the side of the transparent substrate 2 having a light shielding portion.

In this manner, an optical member illustrated in FIG. 4 can be obtained.

(Third Embodiment)

The optical member of the present invention may be produced according to the third embodiment modified as follows in addition to the first embodiment and the second embodiment.

(Process 1)

First, as illustrated in FIG. 2(*a*), an ultraviolet ray cured resin composition is coated on the surface having a light shielding portion 4 formed thereon on a transparent substrate 2 having a light shielding portion, and then a coating layer (an ultraviolet ray cured resin composition layer 5) thus obtained is irradiated with ultraviolet rays 8, thereby obtaining a cured product layer 6 having a cured part present on the lower side (the transparent substrate side when seen from the ultraviolet ray cured resin composition) of the coating layer and an uncured part present on the upper side (the opposite side to the transparent substrate side) of the coating layer.

(Process 2)

Next, as illustrated in FIG. 2(*b*), a liquid crystal display unit 1 and the transparent substrate 2 having a light shielding portion are bonded to each other in the form that the uncured part of the cured product layer thus obtained and the surface of the liquid crystal display unit 1 face each other. The bonding can be performed in the air or in a vacuum.

(Process 3)

Next, as illustrated in FIG. 2(c), the cured product layer 6 having an uncured part of ultraviolet ray cured resin composition is cured by irradiating the optical member obtained by bonding the transparent substrate 2 and the liquid crystal display unit 1 to each other with ultraviolet rays 8 from the side of the transparent substrate 2 having a light shielding portion.

In this manner, an optical member illustrated in FIG. 4 can be obtained.

Each of the embodiments described above is an embodiment explained several embodiments of the method for producing an optical member of the present invention with reference to a specific optical substrate example. Each of the embodiments is explained using a liquid crystal display unit and a transparent substrate having a light shielding portion. In the producing method of the present invention, however, various kinds of members to be described below can be used as an optical substrate instead of the liquid crystal display unit, and various kinds of members to be described below can also be used as an optical substrate instead of the transparent substrate.

Not only that, as an optical substrate such as a liquid crystal display unit and a transparent substrate, an optical substrate, in which another optical substrate layer (for example, a film bonded using a cured product layer of an ultraviolet ray cured resin composition or another optical substrate layer) is further laminated to these various substrates, may be used.

Moreover, all of the coating method of ultraviolet ray cured resin composition, the film thickness of cured product of resin, the irradiation dose and light source at the time of ultraviolet rays irradiation, and the film thickness adjustment method of the uncured part by blowing oxygen or ozone upon the surface of ultraviolet ray cured resin layer, which are described in the section of the first embodiment, are not only applied to the embodiments described above but can also be applied to any of the producing methods included in the present invention.

Specific aspects of the optical member, including the liquid crystal display unit, capable of being produced by from the first embodiment to the third embodiment described above are represented below.

(i) An aspect in which an optical substrate having a light shielding portion is at least an optical substrate selected from the group consisting of a transparent glass substrate having a light shielding portion, a transparent resin substrate having a light shielding portion, and a glass substrate having a light shielding portion and a transparent electrode formed thereon, another optical substrate bonded thereto is at least a display body unit selected from the group consisting of a liquid crystal display unit, a plasma display unit, and an organic EL display unit, and the optical member to be obtained is the display body unit having an optical substrate having a light shielding portion.

(ii) An aspect in which one optical substrate is a protective substrate having a light shielding portion and the other optical substrate to be bonded thereto is a touch panel or a display body unit having a touch panel, and an optical member including at least two optical substrates bonded to each other is a touch panel having a protective substrate having a light shielding portion or a display body unit having the touch panel.

In this case, either one or both of the surface provided with a light shielding portion of the protective substrate having a light shielding portion and the touch surface of the touch panel are preferably coated with the ultraviolet ray cured resin composition in Process 1.

(iii) An aspect in which one optical substrate is an optical substrate having a light shielding portion and the other optical substrate to be bonded thereto is a display body unit, and an optical member including at least two optical substrates bonded to each other is a display body unit having an optical substrate having a light shielding portion.

In this case, either one or both of the surface of the side provided with a light shielding portion of the optical substrate having a light shielding portion or the display surface of the display body unit are preferably coated with the ultraviolet ray cured resin composition in Process 1.

Specific examples of the optical substrate having a light shielding portion may include a protective plate for display screen having a light shielding portion or a touch panel provided with a protective substrate having a light shielding portion.

The surface of the side provided with a light shielding portion of an optical substrate having a light shielding portion is, for example, the surface of the side provided with a light shielding portion of a protective plate in a case in which an optical substrate having a light shielding portion is a protective plate for display screen having a light shielding portion. In addition, the surface of the side provided with a light shielding portion of an optical substrate having a light shielding portion means the substrate surface of a touch panel opposite to the touch surface of the touch panel since the surface having a light shielding portion of a protective substrate having a light shielding portion is bonded to the touch surface of the touch panel in a case in which an optical substrate having a light shielding portion is a touch panel having a protective substrate having a light shielding portion.

The light shielding portion of an optical substrate having a light shielding portion may be at any position of the optical substrate, but is generally prepared in a frame shape on the periphery of an optical substrate of transparent platy shape or sheet shape. The width thereof is about from 0.5 to 10 mm, preferably about from 1 to 8 mm, and more preferably about from 2 to 8 mm.

Next, the ultraviolet ray cured resin composition of the present invention will be described.

The ultraviolet ray cured resin composition of the present invention contains (A) a (meth)acrylate and (B) a photopolymerization initiator. In addition, other components capable of being added to an ultraviolet ray cured resin composition used for optics can be contained as an arbitrary component.

Meanwhile, the phrase "capable of being added to an ultraviolet ray cured resin composition used for optics" means that an additive deteriorating the transparency of cured product to an extent that the cured product cannot be used for optics is not contained.

A preferred average transmittance of a sheet is at least 90% at the light having a wavelength of from 400 to 800 nm when the sheet of cured product having a thickness of 200 µm after curing is prepared using the ultraviolet ray cured resin composition used in the present invention.

The compositional proportion of the ultraviolet ray cured resin composition is that (A) the (meth)acrylate is from 25 to 90% by weight and (B) the photopolymerization initiator is from 0.2 to 5% by weight with respect to the total amount of the ultraviolet ray cured resin composition, and other components are the balance.

In the ultraviolet ray cured resin composition of the present invention, any generally used photopolymerization initiator can be used as B) the photopolymerization initiator. Among them, acylphosphine oxide can be exemplified as a preferred polymerization initiator. A cured product layer having both of a cured part and an uncured part can be better formed if acylphosphine oxide is used.

(A) The (meth)acrylate in the ultraviolet ray cured resin composition of the present invention is not particularly limited, but any one selected from the group consisting of an urethane(meth)acrylate, a (meth)acrylate having a polyisoprene backbone, and a (meth)acrylate monomer is preferably used. A more preferred aspect is that the ultraviolet ray cured resin composition of the present invention contains both of (i) at least either an urethane(meth)acrylate or a (meth)acrylate having a polyisoprene backbone, and (ii) a (meth)acrylate monomer, as (A) the (meth)acrylate.

Meanwhile, the "(meth)acrylate" in the present specification means either one or both of methacrylate and acrylate. The same applies to "(meth)acrylic acid" or the like.

The urethane(meth)acrylate is obtained by reacting three of a polyhydric alcohol, a polyisocyanate, and a hydroxyl group-containing (meth)acrylate.

Examples of the polyhydric alcohol include an alkylene glycol having from 1 to 10 carbon atoms such as neopentyl glycol, 3-methyl-1,5-pentanediol, ethylene glycol, propylene glycol, 1,4-butanediol, and 1,6-hexanediol; a triol such as trimethylolpropane and pentaerythritol; an alcohol having a cyclic backbone such as tricyclodecanedimethylol and bis-[hydroxymethyl]-cyclohexane; and a polyester polyol obtained by the reaction of these polyhydric alcohols and a polybasic acid (for example, succinic acid, phthalic acid, hexahydrophthalic anhydride, terephthalic acid, adipic acid, azelaic acid, and tetrahydrophthalic anhydride); a caprolactone alcohol obtained by the reaction of a polyhydric alcohol and ε-caprolactone; a polycarbonate polyol (for example, a polycarbonate diol obtained by the reaction of 1,6-hexanediol and diphenyl carbonate); or a polyether polyol (for example, polyethylene glycol, polypropylene glycol, polytetramethylene glycol, and ethylene oxide modified bisphenol A). Polypropylene glycol is preferable as the polyhydric alcohol from the viewpoint of the compatibility with other (A) components, and polypropylene glycol having a weight average molecular weight of 2,000 or more is particularly preferable from the viewpoint of the adherence to a substrate. The upper limit of the weight average molecular weight at this time is not particularly limited, but is preferably 10,000 or less and more preferably 5,000 or less.

Examples of an organic polyisocyanate include isophorone diisocyanate, hexamethylene diisocyanate, tolylene diisocyanate, xylene diisocyanate, diphenylmethane-4,4'-diisocyanate, or dicyclopentanyl isocyanate.

In addition, as the hydroxyl group-containing (meth) acrylate, for example, a hydroxyl C2-C4 alkyl(meth)acrylate such as hydroxyethyl(meth)acrylate, hydroxypropyl(meth) acrylate, and hydroxybutyl(meth)acrylate; dimethylolcyclohexyl mono(meth)acrylate; hydroxycaprolactone(meth) acrylate; and hydroxy-terminated polyalkylene glycol(meth) acrylate can be used.

The reaction to obtain the urethane(meth)acrylate is performed, for example, by the following manner. That is, the polyhydric alcohol and the organic polyisocyanate is mixed such that an isocyanate group of the organic polyisocyanate per 1 equivalent hydroxyl group of the polyhydric alcohol is preferably from 1.1 to 2.0 equivalent and further preferably from 1.1 to 1.5 equivalent, and then the mixture is reacted at preferably from 70 to 90° C., thereby synthesizing an urethane oligomer. Subsequently, the urethane oligomer thus obtained and a hydroxy(meth)acrylate compound is mixed such that the hydroxyl group of the hydroxy(meth)acrylate compound per 1 equivalent isocyanate of the urethane oligomer is preferably from 1 to 1.5 equivalent, and then the mixture is reacted at from 70 to 90° C., thereby obtaining an urethane (meth)acrylate of the intended product.

The weight average molecular weight of the urethane (meth)acrylate is preferably about from 7,000 to 25,000 and more preferably from 10,000 to 20,000. Increase in shrinkage is concerned if the weight average molecular weight is less than 7,000, and deterioration in curability is concerned if the weight average molecular weight is more than 25,000.

With regard to the urethane(meth)acrylate in the ultraviolet ray cured resin composition of the present invention, a kind of urethane(meth)acrylate can be used singly, or two or more kinds thereof can be mixed at an arbitrary proportion and used. The weight proportion of the urethane (meth) acrylate in the ultraviolet ray cured resin composition of the present invention is generally from 20 to 80% by weight and preferably from 30 to 70% by weight.

The (meth)acrylate having a polyisoprene backbone is a compound having a (meth)acryloyl group at a terminal or a side chain of a polyisoprene molecule. The (meth)acrylate having a polyisoprene backbone can be available, for example, as "UC-203" (manufactured by KURARAY CO., LTD). The number average molecular weight of the (meth) acrylate having a polyisoprene backbone is preferably from 10,000 to 50,000 and more preferably about from 25,000 to 45,000 in terms of polystyrene.

The weight proportion of the (meth)acrylate having a polyisoprene backbone in the ultraviolet ray cured resin composition of the present invention is generally from 20 to 80% by weight and preferably from 30 to 70% by weight.

As the (meth)acrylate monomer, a (meth)acrylate having one (meth)acryloyl group in the molecule can be suitably used.

Here, a (meth)acrylate monomer indicates a (meth)acrylate other than the urethane the (meth)acrylate, the epoxy the (meth)acrylate to be described below, and the (meth)acrylate having a polyisoprene backbone.

Specific examples of the (meth)acrylate having one (meth)acryloyl group in the molecule may include an alkyl (meth)acrylate having from 5 to 20 carbon atoms such as isooctyl(meth)acrylate, isoamyl(meth)acrylate, lauryl(meth) acrylate, isodecyl(meth)acrylate, stearyl(meth)acrylate, cetyl(meth)acrylate, isomyristyl(meth)acrylate, and tridecyl (meth)acrylate; a (meth)acrylate having a cyclic backbone such as benzyl(meth)acrylate, tetrahydrofurfuryl(meth)acrylate, acryloylmorpholine, phenyl glycidyl(meth)acrylate, tricyclodecane(meth)acrylate, dicyclopentenyl acrylate, dicyclopentenyloxyethyl(meth)acrylate, isobornyl(meth) acrylate, dicyclopentanyl(meth)acrylate, 1-adamantyl acrylate, 2-methyl-2-adamantyl acrylate, 2-ethyl-2-adamantyl acrylate, 1-adamantyl methacrylate, polypropylene oxide modified nonylphenyl(meth)acrylate, and dicyclopentadieneoxyethyl(meth)acrylate; an alkyl(meth)acrylate having from 1 to 5 carbon atoms, which has a hydroxyl group such as 2-hydroxypropyl(meth)acrylate and 4-hydroxybutyl (meth)acrylate; a polyalkylene glycol(meth)acrylate such as ethoxydiethylene glycol(meth)acrylate, polypropylene glycol(meth)acrylate, and polypropylene oxide modified nonylphenyl(meth)acrylate; and a (meth)acrylate phosphate such as ethylene oxide modified phenoxylated(meth)acrylate phosphate, ethylene oxide modified butoxylated(meth) acrylate phosphate, and ethylene oxide modified octyloxylated(meth)acrylate phosphate.

As the (meth)acrylate having one (meth)acryloyl group in the molecule, among others, a compound selected from a group consisting of an alkyl(meth)acrylate having from 10 to 20 carbon atoms, 2-ethylhexyl carbitol acrylate, acryloylmorpholine, 4-hydroxybutyl(meth)acrylate, tetrahydrofurfuryl(meth)acrylate, isostearyl(meth)acrylate, dicyclopentenyloxyethyl(meth)acrylate, and polypropylene oxide modified nonylphenyl(meth)acrylate is preferably used. Particularly, a compound selected from the group consisting of an alkyl (meth)acrylate having from 10 to 20 carbon atoms, dicyclopentenyloxyethyl(meth)acrylate, polypropylene oxide modified nonylphenyl(meth)acrylate, and tetrahydrofurfuryl (meth)acrylate is preferably used, an alkyl(meth)acrylate having from 10 to 20 carbon atoms is more preferably used, and lauryl(meth)acrylate is further preferably used from the viewpoint of flexibility of resin.

Meanwhile, as the (meth)acrylate monomer, at least one of an alkyl(meth)acrylate having from 1 to 5 carbon atoms, which has a hydroxyl group, and acryloylmorpholine is preferably used, and acryloylmorpholine is particularly preferably used from the viewpoint of improvement in adherence to glass.

As the (meth)acrylate monomer, both of an alkyl(meth) acrylate having from 10 to 20 carbon atoms and an alkyl (meth)acrylate having from 1 to 5 carbon atoms, which has a hydroxyl group, or acryloylmorpholine are preferably contained, and both of lauryl(meth)acrylate and acryloylmorpholine are preferably contained.

The composition of the present invention can contain a multifunctional (meth)acrylate monomer other than the (meth)acrylate having one (meth)acryloyl group in the range that the characteristics of the present invention are not impaired.

Examples of the multifunctional (meth)acrylate monomer may include a bifunctional (meth)acrylate such as tricyclodecanedimethylol di(meth)acrylate, dioxane glycol di(meth) acrylate, polypropylene glycol di(meth)acrylate, polytetramethylene glycol di(meth)acrylate, alkylene oxide modified bisphenol A type di(meth)acrylate, caprolactone modified hydroxypivalic acid neopentyl glycol di(meth) acrylate, and ethylene oxide modified di(meth)acrylate phosphate; a trifunctional (meth)acrylate such as a trimethylol C2-C10 alkane tri(meth)acrylate such as trimethylolpropane tri(meth)acrylate, and trimethyloloctane tri(meth) acrylate, trimethylol C2-C10 alkane polyalkoxy tri(meth) acrylate such as trimethylolpropane polyethoxy tri(meth) acrylate, trimethylolpropane polypropoxy tri(meth)acrylate, and trimethylolpropane polyethoxy polypropoxy tri(meth) acrylate, tris[(meth)acryloyloxyethyl]isocyanurate, pentaerythritol tri(meth)acrylate, and alkylene oxide modified trimethylolpropane tri(meth)acrylate such as ethylene oxide modified trimethylolpropane tri(meth)acrylate and propylene oxide modified trimethylolpropane tri(meth)acrylate; and a tetrafunctional or more (meth)acrylate such as pentaerythritol polyethoxy tetra(meth)acrylate, pentaerythritol polypropoxy tetra(meth)acrylate, pentaerythritol tetra(meth) acrylate, ditrimethylolpropane tetra(meth)acrylate, dipentaerythritol tetra(meth)acrylate, dipentaerythritol penta(meth)acrylate, and dipentaerythritol hexa(meth)acrylate.

In the present invention, a bifunctional (meth)acrylate is preferably used in order to suppress cure shrinkage in a case in which the polyfunctional (meth)acrylate described above is concurrently used.

With regard to these (meth)acrylate monomers in the ultraviolet ray cured resin composition of the present invention, a kind of (meth)acrylate monomer can be used singly, or two or more kinds thereof can be mixed at an arbitrary proportion and used. The weight proportion of the (meth) acrylate monomer in the ultraviolet ray cured resin composition of the present invention is generally from 5 to 70% by weight and preferably from 10 to 50% by weight. Deterioration in curability is concerned if the weight proportion is less than 5% by weight, and increase in shrinkage is concerned if the weight proportion is more than 70% by weight.

In the aspect, in which the ultraviolet ray cured resin composition of the present invention contains both of (i) at least either an urethane(meth)acrylate or a (meth)acrylate having a polyisoprene backbone, and (ii) a (meth)acrylate monomer, the total content of both (i) and (ii) is generally from 25 to 90% by weight, preferably from 40 to 90% by weight, and more preferably from 40 to 80% by weight with respect to the total amount of the resin composition.

In the ultraviolet ray cured resin composition of the present invention, an epoxy(meth)acrylate can be used as (A) the (meth)acrylate in a range that the characteristics of the present invention are not impaired.

An epoxy(meth)acrylate has a function that increases curability, hardness of cured product, or cure rate. As the epoxy(meth)acrylate, any epoxy(meth)acrylate obtained by reacting a glycidyl ether type epoxy compound with (meth) acrylic acid can be used.

As the glycidyl ether type epoxy compound in order to obtain an epoxy(meth)acrylate to be preferably used, a diglycidyl ether of bisphenol A or an alkylene oxide adduct thereof, a diglycidyl ether of bisphenol F or an alkylene oxide adduct thereof, a diglycidyl ether of hydrogenated bisphenol A or an alkylene oxide adduct thereof, a diglycidyl ether of hydrogenated bisphenol F or an alkylene oxide adduct thereof, ethylene glycol diglycidyl ether, propylene glycol diglycidyl ether, neopentyl glycol diglycidyl ether, butanediol diglycidyl ether, hexanediol diglycidyl ether, cyclohexanedimethanol diglycidyl ether, polypropylene glycol diglycidyl ether, and the like can be exemplified.

An epoxy(meth)acrylate is obtained by reacting these glycidyl ether type epoxy compounds with (meth)acrylic acid under the following conditions.

The glycidyl ether type epoxy compound and (meth) acrylic acid are reacted at a ratio of from 0.9 to 1.5 mole more preferably from 0.95 to 1.1 mole of (meth)acrylic acid per 1 equivalent epoxy group of the glycidyl ether type epoxy compound. The reaction temperature is preferably from 80 to 120° C., and the reaction time is about from 10 to 35 hours. In order to promote the reaction, for example, a catalyst such as triphenylphosphine, TAP, triethanolamine, and tetraethyl ammonium chloride is preferably used. In addition, p-methoxyphenol and methylhydroquinone can also be used as a polymerization inhibitor in order to prevent polymerization during reaction.

As the epoxy(meth)acrylate suitably usable in the present invention, a bisphenol A type epoxy(meth)acrylate obtained from a bisphenol A type epoxy compound is exemplified. The weight average molecular weight of the epoxy(meth) acrylate suitably usable in the present invention is preferably from 500 to 10,000.

The weight proportion of the epoxy(meth)acrylate in the ultraviolet ray cured resin composition of the present invention is generally from 1 to 80% by weight and preferably from 5 to 30% by weight.

The content proportion of (A) the (meth)acrylate in the ultraviolet ray cured resin composition of the present invention is from 25 to 90% by weight, preferably from 40 to 90% by weight, and more preferably from 40 to 80% by weight with respect to the total amount of the ultraviolet ray cured resin composition.

In the ultraviolet ray cured resin composition of the present invention, it is preferable to contain at least one selected from the group consisting of the urethane(meth)acrylate, the (meth)acrylate having a polyisoprene backbone, and the (meth)acrylate monomer as (A) the (meth)acrylate; it is more preferable that the content proportion of the urethane(meth)acrylate is from 20 to 80% by weight and preferably from 30 to 70% by weight, the content proportion of the (meth)acrylate having a polyisoprene backbone is from 20 to 80% by weight and preferably from 30 to 70% by weight, and the content proportion of the (meth)acrylate monomer is from 5 to 70% by weight and preferably from 10 to 50% by weight.

In the ultraviolet ray cured resin composition of the present invention, it is further preferable that either the urethane(meth)acrylate or the (meth)acrylate having a polyisoprene backbone is contained as (A) the (meth)acrylate and the content proportion thereof is from 20 to 80% by weight and preferably from 30 to 70% by weight, and the (meth)acrylate monomer is contained as (A) the (meth)acrylate and the content proportion thereof is from 5 to 70% by weight and preferably from 10 to 50% by weight.

As (B) the photopolymerization initiator contained in the composition of the present invention, any publicly known photopolymerization initiator can be used.

As (B) the photopolymerization initiator, an acylphosphine oxide compound is preferably used. Improvement in transparency of the cured product layer of resin can be expected by containing an acylphosphine oxide compound in the ultraviolet ray cured resin composition. Specific examples of the acylphosphine oxide compound include 2,4,6-trimethyl benzoyl diphenyl phosphine oxide, 2,4,6-trimethyl benzoyl phenyl ethoxy phosphine oxide, bis(2,4,6-trimethyl benzoyl)-phenyl phosphine oxide, and bis(2,6-dimethoxybenzoyl)-2,4,4-trimethyl-pentyl phosphine oxide.

As (B) the photopolymerization initiator, 2,4,6-trimethyl benzoyl diphenyl phosphine oxide is particularly preferable from the viewpoint of easy formation of the uncured part and the transparency of the cured product layer of resin when a cured product layer of resin having a cured part and an uncured part by irradiating an ultraviolet ray cured resin after coating with ultraviolet rays.

As a compound usable as (B) the photopolymerization initiator other than the acylphosphine oxide compound, for example, 1-hydroxycyclohexyl phenyl ketone (Irgacure (trade name, the same applies hereinafter) 184; manufactured by BASF), 2-hydroxy-2-methyl-[4-(1-methylvinyl)phenyl]propanol oligomer (Esacure ONE; manufactured by Lamberti S.p.A.), 1-[4-(2-hydroxyethoxy)-phenyl]-2-hydroxy-2-methyl-1-propane-1-one (Irgacure 2959; manufactured by BASF), 2-hydroxy-1-{4-[4-(2-hydroxy-2-methyl-propionyl)-benzyl]-phenyl}-2-methyl-propan-1-one (Irgacure 127; manufactured by BASF), 2,2-dimethoxy-2-phenyl acetophenone (Irgacure 651; manufactured by BASF), 2-hydroxy-2-methyl-1-phenyl-propan-1-one (Darocur (trade name) 1173; manufactured by BASF), 2-methyl-1-[4-(methylthio)phenyl]-2-morpholino-1-one (Irgacure 907; manufactured by BASF), a mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester (Irgacure 754; manufactured by BASF), 2-benzyl-2-dimethylamino-1-(4-morpholinophenyl)-butane-1-one, 2-chlorothioxantone, 2,4-dimetylthioxantone, 2,4-diisopropylthioxantone, and isopropylthioxanthone can be included.

In the ultraviolet ray cured resin composition of the present invention, a kind of these (B) photopolymerization initiators can be used singly, or two or more kinds thereof can be mixed at an arbitrary proportion and used. The weight proportion of (B) the photopolymerization initiator in the ultraviolet ray cured resin composition of the present invention is generally from 0.2 to 5% by weight and preferably from 0.3 to 3% by weight. If the weight proportion is more than 5% by weight, there is a concern that the uncured part is not formed or the transparency of the cured product layer of resin deteriorates when a cured product layer having both of a cured part and an uncured part is prepared. In addition, if (B) the photopolymerization initiator is too little, the resin composition cannot be sufficiently cured.

The ultraviolet ray cured resin composition of the present invention can contain a photopolymerization initiation auxiliary to be described below, a compound having a structure represented by Formula (1) to be described below, a softening component to be described below, and the additives to be described below as components other than (A) the (meth)acrylate described above and (B) the photopolymerization initiator described above. The content proportion of other components with respect to the total amount of the ultraviolet ray cured resin composition of the present invention is the balance obtained by subtracting the total amount of (A) the (meth)acrylate and (B) the photopolymerization initiator from the total amount of the ultraviolet ray cured resin composition. Specifically, the total amount of other components is from 0 to 74.8% by weight and preferably about from 5 to 70% by weight with respect to the total amount of the ultraviolet ray cured resin composition of the present invention.

In the ultraviolet ray cured resin composition of the present invention, an amine capable of being a photopolymerization initiation auxiliary can also be concurrently used with (B) the photopolymerization initiator as one of other components. Examples of the usable amine include benzoic acid 2-dimethylaminoethyl ester, dimethylaminoacetophenone, p-dimethylaminobenzoic acid ethyl ester, or p-dimethylaminobenzoic acid isoamyl ester. In a case where a photopolymerization initiation auxiliary such as the amine is used, the content thereof in the resin composition for adhesion of the present invention is generally from 0.005 to 5% by weight and preferably from 0.01 to 3% by weight.

A compound having a structure represented by Formula (1) can be contained in the ultraviolet ray cured resin composition of the present invention if necessary.

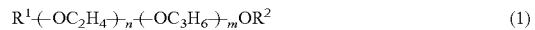    (1)

(In Formula (1), n represents an integer from 0 to 40, and m represents an integer from 10 to 50. $R^1$ and $R^2$ may be the same as or different from each other. $R^1$ and $R^2$ are an alkyl group having from 1 to 18 carbon atoms, an alkenyl group having from 1 to 18 carbon atoms, an alkynyl group having from 1 to 18 carbon atoms, and an aryl group having from 5 to 18 carbon atoms.)

The compound having a structure represented by Formula (1) can be available, for example, as UNISAFE PKA-5017 manufactured by NOF CORPORATION (trade name, polyethylene glycol-polypropylene glycol allylbutyl ether).

The weight proportion of the compound having a structure represented by Formula (1) in the ultraviolet ray cured resin composition of the present invention is generally from 10 to 80% by weight and preferably from 10 to 70% by weight when the compound having a structure represented by Formula (1) is used.

In the ultraviolet ray cured resin composition of the present invention, a softening component other than those described above can be used if necessary. A publicly known softening component and plasticizer generally used in an ultraviolet ray cured resin can be used as the softening component other than those described above in the present invention. Specific examples of the usable softening component include a polymer or oligomer other than the (meth) acrylate or the compound having a structure represented by Formula (1), an ester of phthalic acid, an ester of phosphoric acid, a glycol ester, an ester of citric acid, an ester of aliphatic dibasic acid, an ester of fatty acid, an epoxy plasticizer, castor oils, and a hydrogenated terpene resin. Examples of the polymer or oligomer may include a polymer or oligomer having a polyisoprene backbone, a polymer or oligomer having a polybutadiene backbone, or a polymer or oligomer having a xylene backbone, and any ester thereof. A polymer or oligomer having a polybutadiene backbone and any ester thereof is preferably used depending on the case. Specific examples of the polymer or oligomer having a polybutadiene backbone and an ester thereof include butadiene homopolymer, epoxy modified polybutadiene, butadiene-styrene random copolymer, maleic acid modified polybutadiene, and terminal hydroxyl group modified liquid polybutadiene.

The weight proportion of the softening component in the ultraviolet ray cured resin composition is generally from 10 to 80% by weight and preferably from 10 to 70% by weight in a case in which the softening component is used.

In the ultraviolet ray cured resin composition of the present invention, an additive such as an antioxidant, an organic solvent, a coupling agent, a polymerization inhibitor, a leveling agent, an antistatic agent, a surface lubricant, a fluorescent whitening agent, a light stabilizer (for example, a hindered amine compound, or the like), or a filler may be added if necessary.

Specific examples of the antioxidant include BHT, 2,4-bis-(n-octylthio)-6-(4-hydroxy-3,5-di-t-butylanilino)-1,3,5-triazine, pentaerythrityl.tetrakis[3-(3,5-di-t-butyl-4-hydroxyphenyl) propionate], 2,2-thio-diethylene bis[3-(3,5-di-t-butyl-4-hydroxyphenyl) propionate], triethylene glycol-bis[3-(3-t-butyl-5-methyl-4-hydroxyphenyl) propionate], 1,6-hexanediol-bis[3-(3-t-butyl-5-methyl-4-hydroxyphenyl) propionate], octadecyl-3-(3,5-di-t-butyl-4-hydroxyphenyl) propionate, N,N-hexamethylene bis(3,5-di-t-butyl-4-hydroxy-hydrocinnamamide), 1,3,5-trimethyl-2,4,6-tris(3,5-di-t-butyl-4-hydroxybenzyl)benzene, tris-(3,5-di-t-butyl-4-hydroxybenzyl)-isocyanurate, octyl diphenylamine, 2,4-bis[(octylthio)methyl-O-cresol, isooctyl-3-(3,5-di-t-butyl-4-hydroxyphenyl) propionate], and dibutylhydroxytoluene.

Specific examples of the organic solvent include an alcohol such as methanol, ethanol, and isopropyl alcohol, dimethyl sulfone, dimethyl sulfoxide, tetrahydrofuran, dioxane, toluene, and xylene.

Examples of the coupling agent include a silane coupling agent, a titanium-based coupling agent, a zirconium-based coupling agent, and an aluminum-based coupling agent.

Specific examples of the silane coupling agent include 3-glycidoxypropyltrimethoxysilane, 3-glycidoxypropylmethyldimethoxysilane, 3-glycidoxypropylmethyldimethoxysilane, 2-(3,4-epoxycyclohexyl)ethyltrimethoxysilane, N-(2-aminoethyl)3-aminopropylmethyldimethoxysilane, γ-mercaptopropyltrimethoxysilane, N-(2-aminoethyl)3-aminopropylmethyltrimethoxysilane, 3-aminopropyltriethoxysilane, 3-mercaptopropyltrimethoxysilane, vinyltrimethoxysilane, N-(2-(vinylbenzylamino)ethyl)3-aminopropyltrimethoxysilane hydrochloride, 3-methacryloxypropyltrimethoxysilane, 3-chloropropylmethyldimethoxysilane, and 3-chloropropyltrimethoxysilane.

Specific examples of the titanium-based coupling agent include isopropyl (N-ethylamino-ethylamino) titanate, isopropyl triisostearoyl titanate, titanium di(dioctyl pyrophosphate)oxyacetate, tetraisopropyl di(dioctyl phosphite) titanate, and neoalkoxy tri(p-N-(β-aminoethyl)aminophenyl) titanate.

Specific examples of the zirconium-based coupling agent and the aluminum-based coupling agent include Zr-acetylacetonate, Zr-methacrylate, Zr-propionate, neoalkoxy zirconate, neoalkoxy tris(neodecanoyl) zirconate, neoalkoxy tris(dodecanoyl)benzenesulfonyl zirconate, neoalkoxy tris (ethylene amino ethyl) zirconate, neoalkoxy tris(m-aminophenyl) zirconate, ammonium zirconium carbonate, Al-acetylacetonate, Al-methacrylate, and Al-propionate.

Specific examples of the polymerization inhibitor include p-methoxyphenol and methylhydroquinone.

Specific examples of the light stabilizer include 1,2,2,6,6-pentamethyl-4-piperidyl alcohol, 2,2,6,6-tetramethyl-4-piperidyl alcohol, 1,2,2,6,6-pentamethyl-4-piperidyl(meth) acrylate (Product name: LA-82 manufactured by ADEKA CORPORATION), tetrakis(1,2,2,6,6-pentamethyl-4-piperidyl)-1,2,3,4-butane tetracarboxylate, tetrakis(2,2,6,6-tetramethyl-4-piperidyl)-1,2,3,4-butane tetracarboxylate, a mixed ester product of 1,2,3,4-butane tetracarboxylic acid, 1,2,2,6,6-pentamethyl-4-piperidinol, and 3,9-bis(2-hydroxy-1,1-dimethylethyl)-2,4,8,10-tetraoxaspiro[5.5]undecane, decanedioic acid bis(2,2,6,6-tetramethyl-4-piperidyl) sebacate, bis(1-undecane-2,2,6,6-tetramethylpiperidin-4-yl) carbonate, 2,2,6,6-tetramethyl-4-piperidyl methacrylate, bis(2,2,6,6-tetramethyl-4-piperidyl) sebacate, bis(1,2,2,6,6-pentamethyl-4-piperidyl) sebacate, 4-benzoyloxy-2,2,6,6-tetramethylpiperidine, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine, 1,2,2,6,6-pentamethyl-4-piperidinyl-(meth)acrylate, bis(1,2,2,6,6-pentamethyl-4-piperidinyl)[[3,5-bis(1,1-dimethylethyl)-4-hydroxyphenyl]methyl]butyl malonate, decanedioic acid bis(2,2,6,6-tetramethyl-1(octyloxy)-4-piperidinyl) ester, a reaction product of 1,1-dimethylethyl hydroperoxide and octane, N,N',N'',N'''-tetrakis-(4,6-bis-(butyl-(N-methyl-2,2,6,6-tetramethylpiperidin-4-yl)amino)-triazine-2-yl)-4,7-diazadecane-1,10-diamine, a polycondensate of dibutylamine.1,3,5-triazine.N,N'-bis(2,2,6,6-tetramethyl-4-piperidyl-1,6-hexamethylenediamine and N-(2,2,6,6-tetramethyl-4-piperidyl)butylamine, poly[[6-(1,1,3,3-tetramethylbutyl)amino-1,3,5-triazine-2,4-diyl][(2,2,6,6-tetramethyl-4-piperidyl)imino]hexamethylene[(2,2,6,6-tetramethyl-4-piperidyl)imino]], a polymer of dimethyl succinate and 4-hydroxy-2,2,6,6-tetramethyl-1-piperidineethanol, 2,2,4,4-tetramethyl-20-(β-lauryloxycarbonyl) ethyl-7-oxa-3,20-diazadispiro[5.1.11.2]heneicosane-21-one, β-alanine, N,-(2,2,6,6-tetramethyl-4-piperidinyl)-dodecyl ester/tetradecyl ester, N-acetyl-3-dodecyl-1-(2,2,6,6-tetramethyl-4-piperidinyl)pyrrolidine-2,5-dione, 2,2,4,4-tetramethyl-7-oxa-3,20-diazadispiro[5,1,11,2]heneicosane-21-one, 2,2,4,4-tetramethyl-21-oxa-3,20-diazadicyclo-[5,1,11,2]-heneicosane-20-propanoic acid dodecyl ester/tetradecyl ester, propanedioic acid, [(4-methoxyphenyl)-methylene]-bis(1,2,2,6,6-pentamethyl-4-piperidinyl) ester, a higher fatty acid ester of 2,2,6,6-tetramethyl-4-piperidinol, a hindered amine-based compound such as 1,3-benzenedicarboxamide and N,N'-bis(2,2,6,6-tetramethyl-4-piperidinyl), a benzophenone-based compound such as octabenzone, 2-(2H-benzotriazol-2-yl)-4-(1,1,3,3-tetramethyl-butyl)phenol, 2-(2-hydroxy-5-methylphenyl)benzotriazole, 2-[2-hydroxy-3-(3,4,5,6-tetrahydrophthalimide-methyl)-5-methylphenyl]benzotriazole, 2-(3-tert-butyl-2-hydroxy-5-methylphenyl)-5-chlorobenzotriazole, 2-(2-hydroxy-3,5-di-tert-pentylphenyl)benzotriazole, a reaction product of methyl 3-(3-(2H-benzotriazol-2-yl)-5-tert-butyl-4-hydroxyphenyl) propionate and polyethylene glycol, a benzotriazole-based compound such as 2-(2H-benzotriazol-2-yl)-6-dodecyl-4-methylphenol, a benzoate-based compound such as 2,4-di-tert-butylphenyl-3,5-di-tert-butyl-4-hydroxybenzoate, and a triazine-based compound such as 2-(4,6-diphenyl-1,3,5-triazin-2-yl)-5-[(hexyl)oxy]phenol. A particularly preferred light stabilizer is a hindered amine-based compound.

Specific examples of the filler include a powder such as crystalline silica, fused silica, alumina, zircon, calcium silicate, calcium carbonate, silicon carbide, silicon nitride, boron nitride, zirconia, stellite, steatite, spinel, titania, and talc, or a bead obtained by spheroidizing these powders.

The content of the additive added if necessary with respect to the total amount of the ultraviolet ray cured resin composition is about from 0 to 3% by weight in total of the additives described above. The content proportion of various kinds of additives is from 0.01 to 3% by weight, preferably from 0.01 to 1% by weight, and more preferably from 0.02 to 0.5% by weight with respect to the total amount of the composition in a case in which the additives are used.

The ultraviolet ray cured resin composition of the present invention can be obtained by mixing and dissolving (A) the (meth)acrylate, (B) the photopolymerization initiator, and, if necessary, other components described above at from room temperature to 80° C. In addition, impurities may be removed by an operation such as filtration if necessary.

It is preferable to adjust the blending ratio of the components appropriately with regard to the composition for adhesion of the present invention such that the viscosity thereof is in a range of from 300 to 15,000 mPa·s at 25° C. in consideration of the coating properties thereof.

The ultraviolet ray cured resin composition of the present invention is used in the method for producing an optical member, in which at least two optical substrates, of which at least either is an optical substrate having a light shielding portion, are bonded to each other by (Process 1) to (Process 3).

The cure shrinkage of the cured product of the ultraviolet ray cured resin composition of the present invention is preferably 3.0% or less, and particularly preferably 2.0% or less. By virtue of this, the internal stress accumulated on the cured product of resin can be reduced, and thus occurring of distortion at the interface between the substrate and the layer of the cured product of the ultraviolet ray cured resin composition can be effectively prevented when the ultraviolet ray cured resin composition is cured.

In addition, if the cure shrinkage is great, the display performance is significantly adversely affected from the time when a warp at the time of curing increases in a case in which the substrate such as glass is thin. The cure shrinkage is preferably small in extent from the viewpoint of this description as well.

The cured product of the ultraviolet ray cured resin composition of the present invention preferably has a transmittance of 90% or more in a wavelength region of from 400 to 800 nm. It is because that it is difficult for light to pass through the cured product in a case in which the transmittance is less than 90%, and thus decrease in visibility of the display image is concerned in a case in which the cured product is used in a display device.

In addition, improvement in visibility of the display image is further expected if the transmittance in a wavelength region of from 400 to 450 nm is high. For this reason, the transmittance in a wavelength region of from 400 to 450 nm is preferably 90% or more.

Several preferred aspects with regard to an ultraviolet ray cured resin composition containing (A) a (meth)acrylate and (B) a photopolymerization initiator, which is used in the producing method of the present invention, are described below. The "% by weight" in the content of respective components denotes the content proportion with respect to the total amount of the ultraviolet ray cured resin composition of the present invention.

(A1)

The ultraviolet ray cured resin composition according to the item (19) described above, in which (A) the (meth)acrylate is at least one (meth)acrylate selected from the group consisting of an urethane(meth)acrylate, a (meth)acrylate having a polyisoprene backbone, and a (meth)acrylate monomer.

(A2)

The ultraviolet ray cured resin composition according to the item (19) described above or (A1) above, which contains both of:

(i) at least either an urethane(meth)acrylate or a (meth)acrylate having a polyisoprene backbone, and (ii) a (meth)acrylate monomer as (A) the (meth)acrylate.

(A3)

The ultraviolet ray cured resin composition according to the item (19) described above or (A1) above, which contains both of:

(i) an urethane(meth)acrylate obtained by a reaction of poly C2-C4 alkylene glycol, diisocyanate, and hydroxy C2-C4 alkyl(meth)acrylate, and (ii) a (meth)acrylate monomer as (A) the (meth)acrylate.

(A4)

The ultraviolet ray cured resin composition according to any one of the items (A1) to (A3) above, in which the weight average molecular weight of the urethane(meth)acrylate is from 7,000 to 25,000.

(A5)

In an ultraviolet ray cured resin composition containing (A) a (meth)acrylate and (B) a photopolymerization initiator, an ultraviolet ray cured resin composition containing an acylphosphine oxide compound as (B) the photopolymerization initiator or the ultraviolet ray cured resin composition according to any one of the items (A1) to (A4) above, which contains an acylphosphine oxide compound as (B) the photopolymerization initiator.

(A6)

The ultraviolet ray cured resin composition according to the item (A5) above, in which the acylphosphine oxide compound is at least a compound selected from a group consisting of 2,4,6-trimethylbenzoyldiphenylphosphine oxide, 2,4,6-trimethylbenzoylphenylethoxyphosphine oxide, bis(2,4,6-trimethyl benzoyl)-phenylphosphine oxide, and bis(2,6-dimethoxybenzoyl)-2,4,4-trimethyl-pentylphosphine oxide.

(A7)

An ultraviolet ray cured resin composition containing (A) a (meth)acrylate and (B) a photopolymerization initiator is an ultraviolet ray cured resin composition further containing other components other than (A) component and (B) component, or the ultraviolet ray cured resin composition according to any one of the items (A1) to (A6) above.

(A8)

The ultraviolet ray cured resin composition according to the item (A7), in which (A) a (meth)acrylate is from 25 to 90% by weight and (B) a photopolymerization initiator is from 0.2 to 5% by weight, and other components are the balance.

(A9)

The ultraviolet ray cured resin composition according to the item (A8), which contains (i) at least either an urethane (meth)acrylate or a (meth)acrylate having a polyisoprene backbone at from 20 to 80% by weight, and (ii) a (meth) acrylate monomer at from 5 to 70% by weight as (A) the (meth)acrylate, and in which the sum of the two is from 40 to 90% by weight.

(A10)

The ultraviolet ray cured resin composition according to any one of the items (A7) to (A9) above, which contains a compound represented by Formula (1) at from 10 to 80% by weight as other components.

(A11)

An ultraviolet ray cured resin composition containing (A) a (meth)acrylate and (B) a photopolymerization initiator or the ultraviolet ray cured resin composition according to any one of the items (A1) to (A10) above, in which the cure shrinkage of the cured product of the ultraviolet ray cured resin composition is 3% or less.

(A12)

An ultraviolet ray cured resin composition containing (A) a (meth)acrylate and (B) a photopolymerization initiator or the ultraviolet ray cured resin composition according to any one of the items (A1) to (A11) above, in which the transmittance of a sheet which is a cured product of ultraviolet ray cured resin composition and has a thickness of 200 μm is that the average transmittance in a wavelength region of from 400 to 450 nm is at least 90%, and the average transmittance in a wavelength region of from 400 to 800 nm is at least 90%.

The ultraviolet ray cured resin composition of the present invention can be suitably used as an adhesive to produce an optical member by bonding plural optical substrates to one another through (Process 1) to (Process 3).

As the optical substrate used in the method for producing an optical member of the present invention, a transparent plate, a sheet, a touch panel, a display body unit, and the like can be exemplified.

The "optical substrate" in the present specification means both of an optical substrate, which does not have a light shielding portion on the surface, and an optical substrate, which has a light shielding portion on the surface. At least one of the plural optical substrates used is an optical substrate having a light shielding portion in the method for producing an optical member of the present invention.

The position of the shielding portion in the optical substrate having alight shielding portion is not particularly limited. As a preferred aspect, a case, in which a belt-shaped light shielding portion having a width of from 0.05 to 20 mm, preferably about from 0.05 to 10 mm, more preferably about from 0.1 to 6 mm is formed on the periphery of the optical substrate, is exemplified. The light shielding portion on an optical substrate can be formed by gluing tape, coating a coating, printing, or the like.

As the material of the optical substrate used in the present invention, diverse materials can be used. Specific examples thereof include PET, PC, PMMA, a composite of PC and PMMA, glass, COC, COP, and a resin such as acrylic resin. As the optical substrate used in the present invention, for example a transparent plate or a sheet, a sheet or transparent plate laminated with plural films such as a polarizing plate or sheets; a sheet or transparent plate not laminated; a transparent plate (an inorganic glass plate and processed goods thereof, for example, a lense, a prism, ITO glass) produced from an inorganic glass; and the like can be used.

In addition, the optical substrate used in the present invention includes a laminated body (hereinafter, it is also referred to as "functional laminated body") formed of a plurality of functional plates or sheets such as a touch panel (a touch panel input sensor) or a display body unit to be described below in addition to the polarizing plate and the like described above.

Examples of the sheet usable as the optical substrate used in the present invention includes an icon sheet, a decorative sheet, and a protective sheet. Examples of the plate (transparent plate) usable in the method for producing an optical member of the present invention include a decorative plate and a protective plate. As the material of these sheets and plates, the materials exemplified as the materials of the transparent plates and sheets above can be adopted.

Examples of the material for the surface of the touch panel usable as the optical substrate used in the present invention include glass, PET, PC, PMMA, a composite of PC and PMMA, COC, and COP.

The thickness of the optical substrate of a platy shape or sheet shape such as a transparent plate or a sheet is not particularly limited, and the thickness is generally from about 5 μm to about 5 cm, preferably from about 10 μm to about 10 mm, and more preferably about from 50 μm to 3 mm.

As a preferred optical member obtainable by the producing method of the present invention, an optical member, in which a transparent optical substrate, which has a light shielding portion and is in a platy shape or sheet shape, and the functional laminated body described above are bonded to each other using the cured product of the ultraviolet ray cured resin composition of the present invention, can be exemplified.

In addition, in the producing method of the present invention, a display body unit with optical functional material (hereinafter, it is also referred to as "display panel") can be produced by using a display body unit such as a liquid crystal display device as an optical substrate and an optical functional material as another optical substrate. Examples of the display body unit include a display device such as an LCD having a polarizing plate bonded to glass, an organic or inorganic EL display, EL lighting, electronic paper, and a plasma display. In addition, examples of the optical functional material include a transparent plastic plate such as an acrylic plate, a PC plate, a PET plate, and a PEN plate, tempered glass, and a touch panel input sensor.

The refractive index of the cured product is more preferably from 1.45 to 1.55 since the visibility of display image is more improved in a case in which the ultraviolet ray cured resin composition of the present invention is used as an adhesive for bonding optical substrates to one another.

If the refractive index of the cured product is in the range, difference in refractive index with a substrate used as an optical substrate can be reduced, diffused reflection of light can be suppressed, and thus optical loss can be reduced.

As preferred aspects of the optical member obtainable by the producing method of the present invention, the following items (i) to (vii) can be exemplified.

(i) An optical member obtained by bonding an optical substrate having a light shielding portion and the functional laminated body to each other using the cured product of the ultraviolet ray cured resin composition of the present invention.

(ii) The optical member according to the item (i) above, in which the optical substrate having a light shielding portion is an optical substrate selected from the group consisting of a transparent glass substrate having a light shielding portion, a transparent resin substrate having a light shielding portion, and a glass substrate having a light shielding portion and a transparent electrode formed thereon, and the functional laminated body is a display body unit or a touch panel.

(iii) The optical member according to the item (ii) above, in which the display body unit is any one of a liquid crystal display unit, plasma display unit, and an organic EL display unit.

(iv) A touch panel (or a touch panel input sensor) obtained by bonding an optical substrate, which has a light shielding portion and is in a platy shape or sheet shape, to the surface of the touch surface side of the touch panel using the cured product of the ultraviolet ray cured resin composition of the present invention.

(v) A display panel obtained by bonding an optical substrate, which has a light shielding portion and is in a platy shape or sheet shape, onto the display screen of the display body unit using the cured product of the ultraviolet ray cured resin composition of the present invention.

(vi) The display panel according to the item (v) above, in which the optical substrate, which has a light shielding portion and is in a platy shape or sheet shape, is a protective substrate to protect the display screen of the display body unit, or a touch panel.

(vii) The optical member, touch panel, or display panel according to any one of the items (i) to (vi) above, in which the ultraviolet ray cured resin composition is the ultraviolet ray cured resin composition according to any one of the item (A1) to (A12) above.

The optical member of the present invention is obtained by bonding plural optical substrates selected from the respective optical substrates described above to one another through the method according to the processes 1 to 3 described above using the ultraviolet ray cured resin composition of the present invention. In Process 1, the ultraviolet ray cured resin composition may be coated on only one surface of the surfaces facing each other via a cured product layer in two optical substrates to be bonded to each other, or may be coated on both of the surfaces.

For example, in the case of the optical member according to the item (ii) above, in which the functional laminated body is a touch panel or a display body unit, the resin composition may be coated on only either one or both of either surface of the protective substrate having a light shielding portion, preferably the surface provided with the light shielding portion, and the touch surface of the touch panel or the display surface of the display body unit in Process 1.

In addition, in the case of the optical member according to the item (vi) above, which is obtained by bonding a protective substrate to protect the display screen of the display body unit, or a touch panel to the display body unit, the resin composition may be coated on only either one or both of the surface provided with a light shielding portion of the protective substrate or the substrate surface opposite to the touch surface of the touch panel, and the display surface of the display body unit in Process 1.

The optical member such as a display panel including a display body unit and an optical substrate having a light shielding portion, which is obtained by the producing method of the present invention can be incorporated into an electronic device such as a TV set, a small game console, a mobile phone, and a personal computer.

EXAMPLES

Hereinafter, the present invention will be described further specifically with reference to Examples, but the present invention is not limited to these Examples.

Preparation of Ultraviolet Ray Cured Resin Composition

An ultraviolet ray cured resin composition A was prepared by heating and mixing 45 parts by weight of urethane acrylate (a reaction product obtained by reacting three components of polypropylene glycol (molecular weight of 3000), isophorone diisocyanate, and 2-hydroxyethyl acrylate at a mole ratio of 1:1.3:2), 25 parts by weight of UNISAFE PKA-5017 (Polyethylene glycol-polypropylene glycol allylbutyl ether, manufactured by NOF CORPORATION), 10 parts by weight of ACMO (acryloylmorpholine, manufactured by KOHJIN Holdings Co., Ltd.), 20 parts by weight of LA (lauryl acrylate, manufactured by OSAKA ORGANIC CHEMICAL INDUSTRY LTD.), and 0.5 part by weight of Speedcure TPO (2,4,6-trimethylbenzoyldiphenylphosphine oxide, manufactured by LAMBSON) (Ultraviolet ray cured resin composition A).

The following evaluations were performed using the ultraviolet ray cured resin composition A of the present invention thus obtained.

Example 1

As illustrated in FIG. 1(a), the ultraviolet ray cured resin composition A thus prepared was coated on the display surface of a liquid crystal display unit 1 having an area of 3.5 inches and on the surface provided with a light shielding portion of a transparent glass substrate 2 having a light shielding portion 4 (width of 5 mm) such that the film thickness on each of the surfaces is 125 μm. Subsequently, each of the coating layers 5 thus obtained was irradiated with ultraviolet rays 8 having a cumulative amount of light of 20 mJ/cm$^2$ from the atmosphere side using an extra-high pressure mercury lamp (TOSCURE (trade name, the same applies hereinafter) 752, manufactured by TOSHIBA Lighting & Technology Corporation), and thus a cured product layer 6 having a cured part present on the lower side (the display body unit side or the transparent substrate side) of the coating layer and an uncured part present on the atmosphere side (the upper side of the coating layer) was formed.

Next, as illustrated in FIG. 1(b), the liquid crystal display unit 1 and the transparent substrate 2 having a light shielding portion was bonded to each other in the form that the uncured parts (not illustrated in the drawing) face each other. Finally, as illustrated in FIG. 1(c), the cured product layer of resin was cured by irradiating the cured product layer 6 with ultraviolet rays 8 having a cumulative amount of light of 2,000 mJ/cm$^2$ from the side of the glass substrate 2 having a light shielding portion using an extra-high pressure mercury lamp (TOSCURE 752, manufactured by TOSHIBA Lighting & Technology Corporation), thereby preparing the optical member of the present invention (a liquid crystal display unit having a transparent glass substrate having a light shielding portion).

Example 2

As illustrated in FIG. 5(a), the ultraviolet ray cured resin composition A thus prepared was coated on the display surface of a liquid crystal display unit 1 such that the film thickness on the display surface is 250 μm. Subsequently, the coating layer 5 thus obtained was irradiated with ultraviolet rays 8 having a cumulative amount of light of 20 mJ/cm$^2$ from the atmosphere side using an extra-high pressure mercury lamp (TOSCURE 752, manufactured by TOSHIBA Lighting & Technology Corporation), and thus a cured product layer 6 having a cured part present on the lower side (display body unit side) of the coating layer and an uncured part present on the upper side of the coating layer (the atmosphere side) was formed.

Next, as illustrated in FIG. 5(b), the liquid crystal display unit 1 and the transparent substrate 2 having a light shielding portion 4 (width of 5 mm) was bonded to each other in the form that the uncured part (not illustrated in the drawing) of the coating layer on the display surface of the liquid crystal display unit and the surface provided with the light shielding portion 4 of the transparent substrate 2 having a light shielding portion face each other. Finally, as illustrated in FIG. 5(c), the cured product layer of resin was cured by irradiating the cured product layer of resin 6 with ultraviolet rays 8 having a cumulative amount of light of 2000 mJ/cm$^2$ from the side of the glass substrate 2 having a light shielding portion using an extra-high pressure mercury lamp (TOSCURE 752, manufactured by TOSHIBA Lighting & Technology Corporation), thereby preparing the optical member of the present invention.

Comparative Example 1

Figure 3:
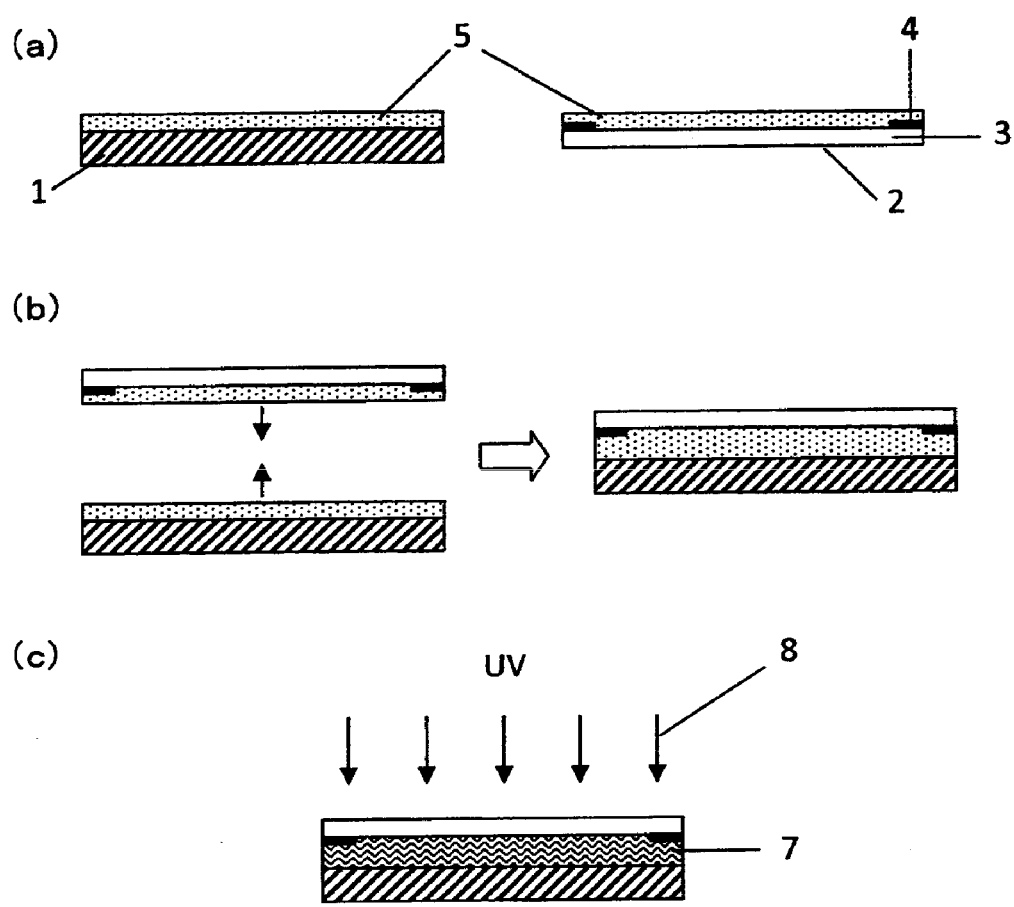
FIGS. 3(a), 3(b) and 3(c) are process diagrams illustrating a producing process according to Comparative Example 1.

As illustrated in FIG. 3(a), the ultraviolet ray cured resin composition A thus prepared was coated on each of the display surface of a liquid crystal display unit 1 and the surface provided with the light shielding portion of a transparent glass substrate 2 having a light shielding portion 4 (width of 5 mm) such that the film thickness on each of the surfaces is 125 μm.

Next, as illustrated in FIG. 3(b), the liquid crystal display unit 1 and the transparent substrate 2 having a light shielding portion 4 was bonded to each other in the form that the coating layers 5 of the ultraviolet ray cured resin composition A face each other. Finally, as illustrated in FIG. 3(c), the ultraviolet ray cured resin composition A was cured by irradiating the coating layers 5 of the ultraviolet ray cured resin composition A with ultraviolet rays 8 having a cumulative amount of light of 2,000 mJ/cm$^2$ from the side of the glass substrate 2 having a light shielding portion using an extra-high pressure mercury lamp (TOSCURE 752, manufactured by TOSHIBA Lighting & Technology Corporation), thereby preparing the optical member of Comparative Example 1.

(Determination of Cure Extent)

The transparent substrate was detached from the optical member thus obtained, and then the cured product layer of resin in the light shielded region shielded from light by the light shielding portion, was washed away with isopropyl alcohol, thereby the uncured resin composition was removed. Thereafter, the cure extent was determined by confirming the cured state of the cured product layer of resin in the light shielded region. The evaluation of cure extent was performed based on the criteria below.
Cure Extent:
○ . . . Cured (traces that the uncured resin composition has been removed cannot be confirmed.)
Δ . . . Uncured (cured product remains, but traces that uncured resin composition have been removed can also be confirmed.)
X . . . Not cured at all (cured product does not remain at all.)

|  | Example 1 | Example 2 | Comparative Example 1 |
|---|---|---|---|
| Cure extent | ○ | ○ | X |

From the result above, it is verified that the cured product layer of resin in the light shielded region exhibited high cure extent although the cured product layer of resin was shielded from ultraviolet rays by the light shielding portion on the protective substrate in the optical member prepared by the producing method of the present invention.

In addition, the following evaluations were performed using the ultraviolet ray cured resin composition A of the present invention, which was obtained in the above.

(Curability)

Two pieces of slide glass having a thickness of 1 mm were prepared, and then the ultraviolet ray cured resin composition A thus obtained was coated on one piece of the two pieces so as to have a film thickness of 200 μm. The other piece of slide glass was bonded to the coated surface of the one piece. The resin composition was irradiated with ultraviolet rays having a cumulative amount of light of 2,000 mJ/cm$^2$ using a high pressure mercury lamp (80 W/cm, ozone free) through the glass. The cured state of the cured product was confirmed, and as a result, the cured product was completely cured.

(Cure Shrinkage)

Two pieces of slide glass, which were coated with a fluorine-based mold releasing agent and have a thickness of 1 mm, were prepared, and then the ultraviolet ray cured resin composition thus obtained was coated on one piece of the two pieces so as to have a film thickness of 200 μm. Thereafter, the two pieces were bonded to each other such that the surfaces coated with mold releasing agent face each other. The resin composition was irradiated with ultraviolet rays having a cumulative amount of light of 2,000 mJ/cm$^2$ using a high pressure mercury lamp (80 W/cm, ozone free) through the glass, thereby curing the resin composition. Thereafter, the two pieces of slide glass were separated from each other, thereby preparing a cured product for specific membrane gravity measurement.

The specific gravity (DS) of the cured product was measured based on JIS K7112 B method. In addition, the liquid specific gravity (DL) of the ultraviolet ray cured resin composition was measured at 25° C. From the measurement result of DS and DL, the cure shrinkage was calculated by the following Expression. As a result, the cure shrinkage was less than 2.0%.

$$\text{Cure shrinkage}(\%) = (DS-DL) \div DS \times 100$$

(Adhesiveness)

A slide glass having a thickness of 0.8 mm and an acrylic plate having a thickness of 0.8 mm were prepared. The ultraviolet ray cured resin composition A thus obtained was coated on one of the two so as to have a film thickness of 200 μm, and then the other was bonded to the coating surface of the one. The resin composition was irradiated with ultraviolet rays having a cumulative amount of light of 2,000 mJ/cm$^2$ using a high pressure mercury lamp (80 W/cm, ozone free) through the glass, thereby curing the resin composition. A sample for adhesiveness evaluation was prepared in this manner. This sample was left to stand at 85° C. under an environment of 85% RH for 250 hours. The flaking of cured product of resin of the slide glass or the acrylic plate was confirmed by visual observation in the sample for evaluation, and as a result, flaking did not occur.

(Flexibility)

The ultraviolet ray cured resin composition A thus obtained was sufficiently cured, and the durometer hardness E was measured by a method based on JIS K7215 using a durometer hardness tester (type E), thereby evaluating the flexibility. More specifically, the ultraviolet ray cured resin composition A was poured into a mold of cylindrical shape so as to have a film thickness of 1 cm, and then the resin composition was irradiated with ultraviolet rays, thereby sufficiently curing the resin composition. The hardness of the cured product thus obtained was measured using a durometer hardness tester (type E). As the result, the measured value was less than 10, and hence it is verified that the cured product exhibits excellent flexibility.

(Transparency)

Two pieces of slide glass, which were coated with a fluorine-based mold releasing agent and have a thickness of 1 mm, were prepared, and then the ultraviolet ray cured resin composition A thus obtained was coated on one piece of the two pieces so as to have a film thickness of 200 μm. Thereafter, the two pieces were bonded to each other such that the surfaces coated with mold releasing agent face each other. The resin composition was irradiated with ultraviolet rays having a cumulative amount of light of 2,000 mJ/cm$^2$ using a high pressure mercury lamp (80 W/cm, ozone free) through the glass, thereby curing the resin composition. Thereafter, the two pieces of slide glass were separated from each other, thereby preparing a cured product for transparency measurement. With regard to the transparency of the cured product thus obtained, the transmittance in wavelength regions of from 400 to 800 nm and from 400 to 450 nm was measured using a spectrophotometer (U-3310 manufactured by Hitachi High-Technologies Corporation). As the result, the transmittance at from 400 to 800 nm was 90% or more and the transmittance at from 400 to 450 nm was also 90% or more.

REFERENCE SIGNS LIST

1 Liquid crystal display unit, 2 Transparent substrate having a light shielding portion, 3 Transparent substrate, 4 Light shielding portion, 5 Coating layer of ultraviolet ray cured resin composition, 6 Cured product layer having an uncured part, 7 Cured product layer of resin, 8 Ultraviolet rays

The invention claimed is:

1. A method for producing an optical member including at least an optical substrate having a light shielding portion and at least a second optical substrate to be bonded to said optical substrate having a light shielding portion, the method comprising the following Processes 1 to 3:

Process 1: coating said optical substrate having a light shielding portion with an ultraviolet ray cured resin composition consisting of (A) a (meth)acrylate, (B) a photo-radical polymerization initiator, and a softening component, to form a coating layer having an optical substrate side and a side opposite said optical substrate side, said side opposite said optical substrate side being exposed to atmosphere and defining an atmosphere side, and irradiating the coating with ultraviolet rays from said atmosphere side, in air, to form a cured product layer having a cured part present on the optical substrate side facing the light shielding portion of the optical substrate and an uncured part present on said side opposite said optical substrate side, the cured part being cured by irradiating, with ultraviolet rays from the atmosphere side, in air, the ultraviolet ray cured resin composition on the light shielding portion of the optical substrate, the uncured part being composed of the ultraviolet ray cured resin composition;

Process 2: a process of bonding said second optical substrate to the uncured part of the cured product layer of the optical substrate having the light shielding portion obtained in Process 1 to form a bonded optical substrate; and Process 3: a process of curing the cured product layer by irradiating the cured product layer having the uncured part in the bonded optical substrate with ultraviolet rays through the bonded optical substrate having the light shielding portion.

2. The method for producing an optical member according to claim 1, wherein the ultraviolet ray cured resin composition includes, as the (meth)acrylate (A), both of
 (i) at least either an urethane(meth)acrylate or a (meth)acrylate having a polyisoprene backbone, and
 (ii) a (meth)acrylate monomer.

3. The method for producing an optical member according to claim 2, wherein the ultraviolet ray cured resin composition includes, as the (meth)acrylate (A),
 a urethane(meth)acrylate which is obtained by reacting a polyhydric alcohol in which a polyester polyol is excluded, a polyisocyanate, and a hydroxyl group-containing (meth)acrylate, and a weight average molecular weight of the urethane(meth)acrylate is from 7,000 to 25,000.

4. The method for producing an optical member according to claim 1, wherein the ultraviolet ray cured resin composition includes, as the (meth)acrylate (A), both of
 (i) an urethane(meth)acrylate obtained by a reaction of poly C2-C4 alkylene glycol, diisocyanate, and hydroxy C2-C4 alkyl(meth)acrylate, and
 (ii) a (meth)acrylate monomer.

5. The method for producing an optical member according to claim 1, wherein an acylphosphine oxide compound is included as the photo-radical polymerization initiator (B).

6. The method for producing an optical member according to claim 5, wherein the acylphosphine oxide compound is at least a compound selected from the group consisting of 2,4,6-trimethylbenzoyldiphenylphosphine oxide, 2,4,6-trimethylbenzoylphenylethoxyphosphine oxide, bis(2,4,6-trimethyl benzoyl)-phenylphosphine oxide, and bis(2,6-dimethoxybenzoyl)-2,4,4-trimethyl-pentylphosphine oxide.

7. The method for producing an optical member according to claim 1, wherein the ultraviolet ray cured resin composition consists of (A) at least a (meth)acrylate selected from the group consisting of an urethane(meth)acrylate, a (meth)acrylate having a polyisoprene backbone, and a (meth)acrylate monomer, (B) a photo-radical polymerization initiator, and a softening component.

8. The method for producing an optical member according to claim 1, wherein the ultraviolet ray cured resin composition includes, as the (meth)acrylate (A),
 (ii) a (meth)acrylate monomer which is at least one kind of a (meth)acrylate having a cyclic backbone selected from the group consisting of acryloylmorpholine, dicyclopentenyl acrylate and dicyclopentanyl (meth)acrylate, in the weight proportion of 10% by weight or more of the ultraviolet ray cured resin composition.

9. The method for producing an optical member according to claim 1, wherein the softening component is
 at least one kind of a compound selected from the group consisting of a compound having a structure represented by Formula (1), an ester of phosphoric acid, a glycol ester, an ester of citric acid, an ester of aliphatic dibasic acid, an ester of fatty acid, an epoxy plasticizer, and a hydrogenated terpene resin:

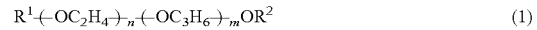

$$R^1\text{--}(\text{OC}_2\text{H}_4)_n\text{--}(\text{OC}_3\text{H}_6)_m\text{OR}^2 \qquad (1)$$

wherein in Formula (1), n represents an integer from 0 to 40; m represents an integer from 10 to 50; and $R^1$ and $R^2$ are the same as or different from each other, and $R^1$ and $R^2$ are an alkyl group having from 1 to 18 carbon atoms, an alkenyl group having from 1 to 18 carbon atoms, an alkynyl group having from 1 to 18 carbon atoms, or an aryl group having from 5 to 18 carbon atoms.

10. The method for producing an optical member according to claim 1, wherein the ultraviolet ray cured resin composition includes, as the (meth)acrylate (A), acryloylmorpholine or dicyclopentenyl acrylate.

11. The method for producing an optical member according to claim 1, wherein the ultraviolet ray cured resin composition includes, as the (meth)acrylate (A), both of:
   (1) a (meth)acrylate having a cyclic backbone, and
   (2) an alkyl (meth)acrylate having from 10 to 20 carbon atoms or an alkyl (meth)acrylate having from 1 to 5 carbon atoms and a hydroxyl group.

12. The method for producing an optical member according to claim 1, wherein said second optical substrate comprises an uncured part of a cured product layer of an optical substrate obtained by Process 1.

* * * * *